(12) United States Patent
Wang et al.

(10) Patent No.: US 8,053,509 B2
(45) Date of Patent: Nov. 8, 2011

(54) STARCH-(METH)ACRYLATE GRAFT COPOLYMER, OIL-SWELLABLE MATERIAL AND OIL- AND WATER-SWELLABLE MATERIAL COMPRISING THE SAME, AND SEALING ARTICLES AND PACKERS PREPARED FROM SAID SWELLABLE MATERIAL

(75) Inventors: Qiang Wang, Beijing (CN); Aili Cao, Beijing (CN); Huian Yi, Beijing (CN)

(73) Assignee: Starse Energy and Technology (Group) Co., Ltd., Beijing (CN)

( * ) Notice: Subject to any disclaimer, the term of this patent is extended or adjusted under 35 U.S.C. 154(b) by 166 days.

(21) Appl. No.: 12/159,728

(22) PCT Filed: Dec. 30, 2006

(86) PCT No.: PCT/CN2006/003702
§ 371 (c)(1),
(2), (4) Date: Nov. 10, 2008

(87) PCT Pub. No.: WO2007/076703
PCT Pub. Date: Jul. 12, 2007

(65) Prior Publication Data
US 2009/0131563 A1 May 21, 2009

(30) Foreign Application Priority Data
Dec. 30, 2005 (CN) .......................... 2005 1 0137574

(51) Int. Cl.
C08F 290/04 (2006.01)
C08L 51/00 (2006.01)
C08L 51/08 (2006.01)
C08K 5/15 (2006.01)
C08K 5/1545 (2006.01)

(52) U.S. Cl. ................ 524/504; 524/95; 524/96; 524/9; 524/47; 525/54.26

(58) Field of Classification Search .................. 524/504, 524/96, 47, 9, 95; 525/54.26
See application file for complete search history.

(56) References Cited

U.S. PATENT DOCUMENTS

| | | | |
|---|---|---|---|
| 4,005,040 A * | 1/1977 | Maher | 260/17.4 |
| 4,568,392 A * | 2/1986 | Dawson et al. | 507/131 |
| 4,753,444 A | 6/1988 | Jackson et al. | |
| 4,781,249 A | 11/1988 | Wood | |
| 4,886,117 A | 12/1989 | Patel | |
| 6,073,692 A | 6/2000 | Wood et al. | |
| 6,423,775 B1 * | 7/2002 | Brune et al. | 525/54.31 |
| 2006/0211580 A1 * | 9/2006 | Wang et al. | 507/209 |
| 2007/0027245 A1 * | 2/2007 | Vaidya et al. | 524/424 |
| 2007/0142547 A1 * | 6/2007 | Vaidya et al. | 524/847 |

FOREIGN PATENT DOCUMENTS

| | | |
|---|---|---|
| CN | 2242332 Y | 12/1996 |
| CN | 1236857 A | 12/1999 |
| CN | 2386189 Y | 7/2000 |
| CN | 1452686 A | 10/2003 |
| CN | 2617919 Y | 5/2004 |
| JP | 55108402 A | 8/1980 |
| JP | 61095014 A | 5/1986 |

OTHER PUBLICATIONS

Wang et al.; "Studies on Preparation and Properties of Oil Swelling Rubber"; Polymer Materials Science and Engineering; Mar. 2003; pp. 206-208, 212; vol. 19, No. 2; China Academic Journal Electronic Publishing House.
Cao et al.; "Synthesis and Performance of Acrylate Modified Cotton Linter High Oil Absorption Resins"; Specialty Petrochemicals; May 2004; pp. 20-23; No. 3; China Academic Journal Electronic Publishing House.
Cao et al.; "Prepare the Water and Oil Absorbability Two Functional Polymers"; Journal of Tianjin Institute of Technology; Sep. 2002; pp. 37-39; vol. 18, No. 3; China Academic Journal Electronic Publishing House.

* cited by examiner

*Primary Examiner* — James J Seidleck
*Assistant Examiner* — Deve E Valdez
(74) *Attorney, Agent, or Firm* — The Webb Law Firm

(57) ABSTRACT

The present invention provides a starch-(meth)acrylate graft copolymer and the preparation process thereof. The starch-(meth)acrylate graft copolymer is prepared by copolymerizing (meth)acrylate monomer and starch in a weight ratio of (0.4~8):1, the graft copolymer having a skeleton of large starch molecule is grafted with one or more (meth)acrylate monomer with a grafting ratio of no less than 70%. The present invention further provides an oil swellable material, which comprises the starch-(meth)acrylate graft copolymer above as the swelling agent; and also an oil- and water-swellable material, which comprises the starch-(meth)acrylate graft copolymer above, water absorbing agent, reactive monomer, surfactant and material matrix. Further, sealing articles and packers prepared from the above oil swellable material and oil- and water-swellable material are also provided.

23 Claims, 4 Drawing Sheets

STARCH-(METH)ACRYLATE GRAFT COPOLYMER, OIL-SWELLABLE MATERIAL AND OIL- AND WATER-SWELLABLE MATERIAL COMPRISING THE SAME, AND SEALING ARTICLES AND PACKERS PREPARED FROM SAID SWELLABLE MATERIAL

FIELD OF THE INVENTION

The present invention relates to a starch-(metha)acrylate (meth)acrylate graft copolymer, oil-swellable material, and oil- and water-swellable material comprising the starch-(meth)acrylate graft copolymer, and sealing articles and packers prepared from said the swellable materials.

BACKGROUND OF THE INVENTION

In the present well plugging technology, various forms of packer for specialized uses have been developed; they may be operated mechanically, hydraulically, hydro mechanically, or operated in a self-sealing manner. For example, in U.S. Pat. No. 6,073,692, a packer comprising a corrugated mandrel is disclosed, in which a mandrel swells as a fluid or mechanical force is applied, which leads to a change in the cross-sectional shape. In U.S. Pat. No. 4,886,117, the packer swells as pressure is accumulated down in the well, in between the inner and outer layers of elastomer, an intermediate sleeve formed of multiple plies of reinforcing strands are present. In U.S. Pat. No. 4,753,444, the annular seal of the packer comprises of poly arylene ketone and the like; the seal is buckled radically outwardly as it is compressed longitudinally, and thereby seals the packer. As described in U.S. Pat. No. 4,781,249, with the use of a valve device, a progressively swollen packer is achieved. In CN2242332Y, a packer comprising a concentric reducer, fluorine, and a lead-sealing ring is disclosed, in which sealing is made possible through the up and down movement of an oil tubing string. In CN2617919Y, the rubber packer swells as the metal jacket slides. In CN1236857A, plugging is achieved by the activation of a rubber packer caused by a water-based fluid under the action of a guilding device. As disclosed in CN2386189Y, the packer comprises an adapter, bushing, rubber packer and the like, in which plugging occurs after supplying water into the packer. Complicated structure constitutes a common disadvantage to the packers above.

To simplify the structure of a well packer, researchers, in recent years, are dedicated to study novel well packers. For example, in CN1452686A (WO 02/20941A1), a well packer is disclosed, in which sealing is achieved by the use of a swellable element fabricating of rubber, outer protecting jacket and reinforcement unit surrounding the swellable element. However, this patent application covers no rubber composition and the preparation thereof. It is well-known that most of the non-polar rubbers have an affinity for oily medium and possess oil absorption capacity. Rubbers of the same kind having different vulcanization components or prepared from different vulicanization process show very differently when they are put in the same solvent over the same period of time, in which some of them are soft and viscous while some of them just simply swell, and they are not reproducible. In addition, both of outer protecting jacket and reinforcement unit are used in this technology, and thus the structure of such packer is relatively complicated.

It is obvious that improvements of the swelling speed and rate of the oil absorbing rubber or the oil absorbing and water absorbing rubber, as well as fulfillment of the harsh condition required down in the well are important for the achievement of the technology in preparing such well packer using the swellable rubber, which represent a problem urgently required to be addressed in the art.

To overcome the above problems, one technical approach is to introduce lipophilic groups into the rubber, which results in the formation of a superior oil swellable rubber. To increase the amount of lipophilic groups in the rubber, two approaches are proposed. One approach is achieved by grafting lipophilic groups to the rubber, which is relatively complicated and the implementation is difficult, thus reports concerning such process have not been found. The other approach is to introduce high oil absorbing resin in the vulcanizing formulation for rubber through blending with rubber by physical blending, which results in the improvement of oil absorbing capacity and swelling capacity. This method is simple, but has a drawback of being difficult to obtain a homogenous dispersion of the 3-dimensional network structure of oil absorbing resin in the rubber matrix.

The inventor of the present invention has developed a new technical approach for preparing a superior oil swellable material, i.e., designing and synthesizing a starch-(meth) acrylate graft copolymer which is lipophilic and capable of improving the swelling speed and rate of oil absorbing materials containing rubber, and which can be effectively used as a swelling agent for the oil swellable material. Moreover, the inventor of the present invention further developed a new oil swellable material, in which the above starch-(meth)acrylate graft copolymer is used as the swelling agent, resulting in a great improvement in oil absorbing capacity and swelling capacity of the current materials, such as rubber. Soil swellable materialealing articles, particularly the well packers, can be made by using above oil swellable material. Since the rubber maintains a certain extent of mechanical strength, requirements for sealing the annular space between the mandrel and the jacket or the well wall could be satisfied. Also, the inventor of the present invention has designed and synthesized oil- and water-swellable materials, as well as sealing articles prepared from the same, particularly well packers.

DISCLOSURE OF THE INVENTION

The object of the present invention is to provide a lipophilic starch-(meth)acrylate graft copolymer, which is capable of improving the oil absorbing rate and swelling rate as well as swelling speed of oil swellable material, such as oil swellable rubber, and thereby which can be used as the swelling agent for the oil swellable material. In the present invention, the term "swelling agent" refers to an agent that can efficiently improve the swelling rate and swelling speed of a high molecular material (such as rubber) in a medium.

Furthermore, another object of the present invention is to provide an oil swellable material which employs the above starch-(meth)acrylate graft copolymer as a swelling agent, the swelling speed and rate of the oil swellable material increase significantly when the material comes into contact with oil.

Moreover, still another object of the present invention is to provide sealing articles and well packers prepared from the above oil swellable material. The oil swellable materials in the sealing articles and packers are activated when coming into contact with oil, which results in a rapid increase in the swelling rate.

Still another object of the present invention is to provide an oil- and water-swellable material, which absorbs both water and oil, and exhibits good swelling property in the mixture of oil and water.

Still another object of the present invention is to provide sealing articles and well packers prepared from the above mentioned oil- and water-swellable material. Swellable materials in the sealing articles and packers are activated when coming into contact with oil and/or water, which results in a rapid increase in the swelling rate.

The above-mentioned objects are attained by providing a novel starch-(meth)acrylate graft copolymer, which is prepared by copolymerizing (meth)acrylate monomer and starch in a ratio of (0.4~8):1 by weight, the resultant graft copolymer has a skeleton of large starch molecule grafted with one or more (meth)acrylate monomer in a grafting ratio of $\geq 70\%$, e.g. 70~90%.

Preferably, the weight ratio of (meth)acrylate monomer and starch is (2~5):1.

The starch-(meth)acrylate graft copolymer of the present invention can be prepared by a copolymerization in the presence of crosslinkers, and also by a non-crosslinked emulsion copolymerization in the absence of crosslinkers.

The starch according to the present invention can be selected from a variety of native starch and starch derivatives. The examples of native starch include cereal starch, potato starch and legume starch, such as Irish potato starch, sweet potato starch, tapioca starch, corn starch, rice starch, glutinous rice starch, wheat starch, sorghum starch and the like; typical examples of starch derivatives are dextrin, crosslinked starch and the like. Regardless of the starch-containing material from which the starch and its derivatives are derived, and the form of the starch (e.g. a straight-chain starch or a branched starch), D-glucose bonded with α-1,4-glucoside or α-1,6-glucoside linkage constitutes the fundamental structure, and thus starch and its derivatives either those described above or those not mentioned here may be applicable to the present invention. It is preferable for the starch used in the present invention to be selected from one or more of Irish potato starch, sweet potato starch and corn starch.

The (meth)acrylate monomer according to the present invention is not particularly limited. As the number of carbon atoms of the (meth)acrylate molecule decreases, the rigidity of the resulting graft copolymer increases, while as the number of carbon atoms of the (meth)acrylate molecule increases, the flexibility of the graft polymer increases. In view of low price, simple process for emulsion copolymerization and increase in the grafting ratio, one or more of the followings are preferred used: methyl acrylate (MA), ethyl acrylate (EA), propyl acrylate (PA), butyl acrylate (BA) and methyl methacrylate (MMA), ethyl methacrylate (EMA), propyl methacrylate (PMA) and butyl methacrylate (BMA).

The starch-(meth)acrylate graft copolymer of the present invention may be a binary copolymer formed of starch and one (meth)acrylate, or a multipolymer formed of starch and two or more (meth)acrylates. For example, a graft copolymer is obtained by copolymerizing starch with methyl (meth) acrylate, ethyl (meth)acrylate and butyl (meth)acrylate at the weight ratio of 1:(0~10):(0~20). When emulsion copolymerization of starch with methyl acrylate (MA), ethyl acrylate (EA) and butyl acrylate (BA) takes place, tetrabasic graft copolymer, known as SG-MA-EA-BA is obtained.

The starch-(meth)acrylate graft copolymer of the present invention may be prepared by non-crosslinked emulsion copolymerization, which comprises the following steps:

Mixing 2~40 parts by weight of water and 1 part by weight of starch, followed by heating up to 20~98° C. under stirring for starch gelatinization;

Adding 0.4~8 parts by weight of (meth)acrylate monomer to the gelatinized starch, then carrying out emulsion copolymerization at 35° C.~80° C. in the presence of emulsifier and initiator. No particular limitation is imposed on the type and amount of the initiator and emulsifier useful in the above preparation process, as long as the non-crosslinked emulsion copolymerization of starch and (meth)acrylate monomer is promoted. For example, as an initiator, it may be selected from those conventionally used in starch grafting, such as cerium nitrate salt, persulfate, sulfate, thiosulfate, L-ascorbic acid, peroxide, azo compounds, ferric chloride, bisulfite and the like. Preferred initiator of the present invention is ceric ammonium nitrate. Emulsifier may be those commonly employed in emulsion copolymerization, such as salts of fatty acids, alkyl sulfate, alkyl sulfonate, alkylaryl sulfonate and the like, in which sodium dodecylbenzenesulfonate is preferred. Among these, emulsifier is preferably present in an amount of 1%~18 wt %, based on the weight of the (meth) acrylate monomer, and preferably 0.3%~16% for initiator, based on the weight of the (meth)acrylate monomer.

Furthermore, the above process may also include the steps of demulsion and purification, in which the demulsifier used for demulsion may be any inorganic salts or acids, such as sodium chloride, acetate and the like. Purification process may include the steps of filtering, washing, drying and the like.

For example, the above preparation process comprises the following steps: mixing deionized water and starch in a weight ratio of (2~40):1, followed by heating up to 20° C.~98° C. in a reactor under stirring for gelatinization, holding the temperature for 10 min~130 min, and then cooling down to ambient temperature. The weight ratio of (meth) acrylate monomer and starch is (0.4~8):1, and polymerization inhibitors were removed from the (meth)acrylate monomer in accordance with conventional operation. Based on the weight of the monomer, emulsifier was present in an amount of 1%~18% while initiator was present in an amount of 0.3%~16%, To the reactor charged with the gelatinized starch, emulsifier, monomer and initiator were added, followed by heating up to 35° C.~80° C. with stirring under nitrogen atmosphere, and holding the temperature for 2 h~5 h. After accomplishing the reaction, adequate amount of demulsifier was added for demulsion, followed by filtering and washing to neutral, and drying to obtain the product.

During the process of the non-crosslinked emulsion copolymerization for the preparation of the starch-(meth)acrylate graft copolymer of the present invention, crosslinkers are not involved. Therefore, differently from the water absorbing resin and the oil absorbing resin, the resulting final copolymer is not present in a crosslinked polymer form with network structure, but rather in a fishbone structure polymer form having the (meth)acrylate grafted to the starch-based skeleton instead, that is, (meth)acrylate is grafted to the main chain and branched chain of the large starch molecule. The number of lipophilic groups present in the polymer increases, and oil absorption is thereby promoted. In addition, differing from the water-absorbing resin, after being grafted with (meth) acrylate, the hydrolysis reaction in the presence of alkali is not required, and ester groups are thus retained. As a result, the non-crosslinked starch-(meth)acrylate graft copolymer of the present invention exhibits higher lipophilicity. When non-crosslinked starch-(meth)acrylate graft copolymer is used as a swelling agent for an oil absorbing rubber, satisfactory oil absorbing rate and swelling capacity can be achieved for the rubber.

The starch-(meth)acrylate graft copolymer may also be prepared by crosslinked polymerization of starch and methacrylate monomer in the presence of additives. Crosslinker is contained in amount of 0.001-5 wt %, based on the weight of the (meth)acrylate monomer.

Crosslinkers include those conventionally employed in crosslinked copolymerization, which include, but not particularly limited to, ethylene glycol diacrylate, ethylene glycol dimethacrylate, diethylene glycol dimethacrylate, polyethylene glycol diacrylate, polyethylene glycol dimethacrylate or propylene glycol diacrylate, N,N'-methylene bis(meth)acrylamide, diallyl phthalate, diallyl terephthalate, diallyl maleate, triallyl polycyanurate, triallyl isocyanurate, divinylbenzene and their mixtures.

The present invention also provides an oil swellable material which comprises the starch-(meth)acrylate graft copolymer as a swelling agent. The oil swellable material includes, but not limited to, oil swellable rubber, oil swellable rubber-plastic material, oil swellable plastic and the like. The more the amount of swelling agent used in the present invention is, the better the swelling effect becomes.

As for the oil swellable rubber comprising the rubber matrix and the starch-(meth)acrylate graft copolymer, the starch-(meth)acrylate graft copolymer is preferably contained in amount of 5~40 parts by weight, based on the 100 parts by weight of the rubber matrix.

The oil swellable rubber may also comprise sufficient amount of vulcanizing agent and/or vulcanization accelerator capable of promoting the vulcanization of oil swellable rubber.

Rubber matrix for the oil swellable rubber applicable to the present invention are not particularly limited, natural rubbers or synthetic rubbers, one or more of the non-polar rubbers and/or polar rubbers may be used. As non-polar rubber is used, due to the intrinsic high lipophilicity of the non-polar rubber, it swells to a certain extent once it comes into contact with oil; while introduction of the starch-(meth)acrylate graft copolymer of the present invention increases the swelling speed and rate of the rubber. Examples of the non-polar rubbers used in the present invention are natural rubber, isoprene rubber, styrene butadiene rubber, cis-1,4-polybutadiene rubber, ethylene-propylene rubber, ethylene-propylene diene terpolymer and the like, which are selected according to the application. Polar rubbers include nitrile-butadiene rubber, hydrogenated nitrile-butadiene rubber, fluororubber, fluorosilicone rubber, polyurethane rubber, neoprene, epichlorohydrin rubber, chlorinated polyethylene rubber, chlorosulfonated polyethylene rubber and the like. Among these, nitrile-butadiene rubber, hydrogenated nitrile-butadiene rubber, fluororubber and fluorosilicone rubber are preferred, Preferred rubber matrixes are one or more of nitrile-butadiene rubber, hydrogenated nitrile-butadiene rubber, ethylene-propylene rubber and ethylene-propylene diene terpolymer.

The oil swellable rubber of the present invention as described above employs the starch-(meth)acrylate graft copolymer of the present invention as the swelling agent.

The type and amount of vulcanizing agents and/or vulcanization accelerators applicable to the oil swellable rubbers of the present invention are not particularly limited, as long as vulcanization of rubbers is promoted. For example, suitable vulcanizing agents include sulphur, sulphur containing organic compounds and organic peroxides, amines and the like. Organic peroxides are, for example, dicumyl peroxide (DCP), di-tert-butyl peroxide (DTBP) and dibenzoyl peroxide (BPO). Amines are, for example, N,N'-m-phenylene bis-maleimide and the like. Sulphur containing organic compounds are, for example, tetramethyl thiuram disulfide (TMTD), 4,4'-dithiodimorpholine (DTDM), Tetraethyl thiuram disulfide (TETD). Suitable accelerators include thiurams such as tetramethyl thiuram disulfide (accelerator TMTD), thiazoles such as 2-mercaptobenzothiazole (accelerator M), sulfenamides such as N-cyclohexylbenzothiazole-2-sulfenamide (accelerator CZ), guanidines such as diphenyl guanidine (accelerator D) and the like. The amount of vulcanizing agents used is preferably 0.3~14 parts by weight and more preferably 2~10 parts by weight, while the amount of vulcanization accelerators used is preferably 0.5~10 parts by weight.

From the standpoint of improving the homogenization of mixing, processability, mechanical properties, workability, and cost reduction for the oil swellable rubber, the oil swellable rubber of the present invention further comprises, but not limited to, one or more additives and accessory ingredients selected from vulcanizing agent, filler, vulcanization accelerator, plasticizer and other additives. Among these, filler includes, but not limited to, carbon black, silicon-containing compounds, such as white carbon black, pot clay, talc powder, mica powder, calcium silicate; carbonates such as calcium carbonate, magnesium carbonate; metal hydroxides such as titanium dioxide, magnesia and zinc oxide; and other inorganics such as graphite. The amount of filler ranges from 2~200 parts by weight. Plasticizer comprises, but not limited to, petroleums such as vaseline, machine oil, paraffin; vegetable oils such as rosin; coal tars such as coal tar, coumarone resin; fatty oils such as glycerin, stearate; synthetic plasticizer such as phthalate (e.g. dibutyl phthalate), aliphatic dibasic acids such as dioctyl adipate; phenolic resins. The amount of plasticizer ranges from 0.5~12 parts by weight. Other additives comprise, but not limited to, reaction products of aldehydes and amines (such as 3-hydroxybutyraldehyde-α-naphthylamine), reaction products of ketones and amines (such as 1,2-dihydro-2,2,4-trimethylquinoline polymer), arylamines (such as N-phenyl-β-naphthylamine), alkylarylamines (such as N-cyclohexyl-p-methoxyaniline), (substituted)phenols (such as p-tert-butylphenol), thiophenols (such as thio bis(di-sec-amyl phenol)), low molecular nitrile-butadiene/diphenylamine graft products, N-(4-phenylaminophenyl)maleimide, N-(4-phenylaminophenyl)methacrylamide, styrene/acrylonitrile random copolymers, nitrile-butadiene rubber/butadiene rubber, chlorinated polyethylene, chlorinated polyvinyl chloride, cellulose acetate/polyacrylonitrile graft copolymer, aliphatic hydrocarbons-cycloalkanes-aromatic hydrocarbons resin mixtures, polystyrene/polyethylene block copolymer and the like.

The oil swellable rubber of the present invention may be obtained by conventional process for the preparation of rubbers. For example, the oil swellable rubber can be obtained by vulcanization subsequent to rubber mixing, in which, mixtures of each components are subjected to rubber mixing in an open mill or closed mill, while vulcanizing press, vulcanizing boiler or the like may be employed for the subsequent vulcanization process.

In the oil swellable rubber of the present invention, as a swelling agent, the starch-(meth)acrylate graft copolymer of the present invention is lipohilic. Therefore the oil absorption rate and swelling capacity of the rubber greatly increase, after homogenously mixed with rubbers, and thereby forming a rubber with superior oil swelling capacity. In addition, as a swelling agent, the starch-(meth)acrylate graft copolymer is preferably obtained by non-crosslinked emulsion polymerization. The copolymer may be dispersed homogeneously in the rubber by way of rubber mixing, without generating sea-island morphology. In the vulcanized oil swellable rubber, due to the network crosslinking and intertwisting between the large molecules of swelling agents and between the large molecules of swelling agent and those of rubber, swelling agents do not precipitate as such readily as that of the oil absorbing resins and additives with small molecules when immersing in oil. Further, due to the presence of D-glucosyl of starch in the starch-(meth)acrylate graft copolymer, the problem of poor workability of rubber resulted from simply adding (meth)acrylate in the rubber is solved. Starch, being one of the swelling agents, is inexpensive and readily available with low cost, and thereby results in a reduction of cost for the oil swellable rubber.

Since the oil swellable rubber of the present invention exhibits significant oil absorbing capacity and swelling capacity, the addition of starch-(meth)acrylate graft copolymer of the present invention renders the rubber a great increase in swelling rate. Thereby it is possible to be used in the manufacture of various sealing articles with superior oil absorbing capacity, wherein the sealing articles comprise, but not limited to, sealing rings, sealing gaskets, sealing strips, sealing plates, swellable jackets, sealing mandrels and the like.

Particularly, by making use of the superior oil absorbing capacity and swelling capacity of the oil swellable rubber of the present invention, the oil swellable rubber is used as plugging material in the present invention for the production of well packers.

More specifically, the present invention provides a well packer, which comprises a hollow mandrel and plugging material coating around the outer surface of hollow mandrel, wherein the plugging material is made of the above oil absorbing rubber of the present invention.

In the well packers described above, the plugging material and hollow mandrel may be integrated by cementing and vulcanizing. Alternatively, the plugging material and hollow mandrel may be in a form of an assembly composed of two movable units.

In view of the harsh conditions like high temperature and high pressure down in the well, nitrile-butadiene rubber and/or hydrogentated nitrile-butadiene rubber are preferably used as the matrix for the plugging material. The combined use of the matrix with ethylene-propylene rubber and/or ethylene-propylene diene terpolymer having relatively good heat resistance gives rise to the formation of oil swellable rubber of the plugging material. The use of nitrile-butadiene rubber and/or hydrogentated nitrile-butadiene rubber with ethylene-propylene rubber and/or ethylene-propylene diene terpolymer acting as the rubber matrix renders a great decrease in cost.

The oil swellable rubber of the present invention comprises rubber matrix and starch-(meth)acrylate graft copolymer; and further comprises, but not limited to, one or more of the following additives: vulcanizing agent, filler, vulcanization accelerator, plasticizer and other additives. Preferably, the starch-(meth)acrylate graft copolymer is contained in 5~40 parts by weight, vulcanizing agent is contained in 0.3~14 parts by weight, filler is contained in 2~200 parts by weight, and vulcanization accelerator is contained in 0.5~10 parts by weight, based on 100 parts by weight of the rubber matrix, As for an oil swellable rubber-plastic material as a kind of the oil swellable material of the present invention, the starch-(meth)acrylate graft copolymer is preferably present in an amount of 5~40 parts by weight, based on 100 parts by weight of the rubber-plastic materials. The oil swellable rubber-plastic material further comprises, but not limited to, one or more of the following additives: vulcanizing agent, filler, vulcanization accelerator, plasticizer and other additives. Preferably, vulcanizing agent is contained in 0.3~14 parts by weight, filler is contained in 2~200 parts by weight, vulcanization accelerator is contained in 0.5~10 parts by weight, and plasticizer is contained in 0.5~12 parts by weight.

The oil swellable rubber-plastic material of the present invention exhibits oil absorbing capacity and swelling capacity, and thereby is applicable to the production of various sealing articles and well packers.

The present invention also provides an oil swellable material, which comprises the above starch-(meth)acrylate graft copolymer, water absorbing agent, reactive monomer, surfactant and material matrix. The starch-(meth)acrylate graft copolymer is contained in 5~40 parts by weight, water absorbing agent is contained in 3~100 parts by weight, reactive monomer is contained in 0~30 parts by weight, and surfactant is contained in 0~70 parts by weight, based on 100 parts by weight of the material matrix. The water-absorbing agent is natural hydrophilic polymer and the derivatives thereof having water absorbing groups; the reactive monomer is monomer having water absorbing groups, or quanterary ammonium salt monomer, or alkenes monomers having hydrophilic groups formed after hydrolysis, which contains unsaturated bonds capable of crosslinking with the water absorbing agent.

As for the above natural hydrophilic polymer or the derivatives thereof containing water absorbing groups, the water absorbing groups include, but not limited to, one or more of the following groups: carboxyl, hydroxyl, ether, amide, amino, sulfonyl, carboxylate group and sulfonate group. Water absorbing agent of the oil- and water-swellable material of the present invention is preferably celluloses and their derivatives, more preferably hydroxyl, carboxyl containing celluloses and their derivatives. Examples of water absorbing groups containing natural hydrophilic polymer or its derivatives include, but not limited to, one or more of the followings: carboxymethyl cellulose (CMC), methyl cellulose (MC), hydroxyethyl cellulose (HEC), hydroxyethyl methyl cellulose (HEMC), hydroxypropyl cellulose (HPC), hydroxypropyl methyl cellulose (HPMC), hydroxymethyl hydroxyethyl cellulose (CMHEC) and the like. As the amount of water absorbing agent increases, water-absorbing capacity of the swellable material becomes better. Preferably, the water absorbing agent is contained in 3~100 parts by weight, more preferably 7~80 parts by weight.

Reactive monomer used in the oil- and water-swellable material of the present invention are water absorbing groups containing monomers, or quaternary ammonium salt monomer, or alkenes monomers having hydrophilic groups formed after hydrolysis, which contains double bonds capable of crosslinking with the water absorbing agent. The water absorbing groups include, but not limited to, one or more of the following groups: carboxyl, hydroxyl, ether, amide, amino, sulfonyl, carboxylate group and sulfonate group. Reactive monomer used in the present invention includes, but not limited to, carboxyl-containing monomer (such as (meth)acrylic acid, maleic acid), carboxylic acid anhydride monomer (such as maleic acid anhydride), carboxylate monomer (such as sodium (meth)acrylate, sodium maleate), sulfonyl monomer (such as (metha)allylsulfonic acid), sulfonate monomer (such as sodium allylsulfonate), hydroxyl containing monomer (such as (metha)allylalcohol), ether-containing monomer (such as poly(ethylene oxide)oxypropylene glycol monoallylether), amide-containing monomer (such as (meth)acrylamide, N-alkylacrylamides (e.g. N-ethylacrylamide), N,N-dialkylacrylamides (e.g. N-dimethylacrylamide), N-hydroxyalkylacrylamides (e.g. N-hydroxyethylmethacrylamide, N-hydroxymethylacrylamide, N,N-dihydroxyalkylacrylamides (e.g. N,N-dihydroxyethylmethacrylamide)), quanterary ammonium salt monomer (such as N,N,N-trimethyl-N-acrylamide oxyethylammonium chloride), hydrophilic monomers formed after hydrolysis (such as vinyl unsaturated carboxylic acids (e.g. lower alkyl esters, such as methyl (meth)acrylate)), cyano-containing monomer (such as (metha)acrylonitrile) and the like. Among these, non-toxic acrylamide monomers are preferred. In the oil swellable material, reactive monomer is preferably present in an amount of 4~20 parts by weight.

Surfactant used in the oil- and water-swellable material of the present invention may be ionic surfactant, non-ionic surfactant, polymeric surfactant and the like. The surfactant may include, but not limited to, one or more ionic surfactants selected from sodium dodecyl sulfate (SDS), sodium dodecyl benzenesulfonate (SDBS), sodium dodecyl sulfonate (DS) and dibutyl naphthalene sulfonate, one or more non-ionic surfactants selected from polyoxyethylene ethers, such as polyoxyethylene cetyl ether (CPE) and the like. Considering of material morphology, workability, cost and application effects, ionic surfactants are preferable and non-ionic surfactants are more preferable. The surfactant is preferably present in an amount of 8~55 parts by weight.

It should be noted that the above ranges represent preferable ranges of the present invention. In case the amount of surfactant exceeds the upper limit, e.g. 80 parts by weight, such surfactant is still applicable to the swellable material, and plays a role in water absorbing and swelling, just giving rise to an even more obvious effect than the surfactant within the preferable ranges does.

Material matrix used in the oil- and water-swellable material of the present invention may be selected from elastomer or non-elastomer, such as rubber, rubber-plastic material or plastic.

The oil- and water-swellable rubber of the present invention may further comprise a vulcanizing agent, wherein the vulcanizing agent is preferably present in an amount of 0.3-14 parts by weight, based on 100 parts by weight of the rubber matrix.

Suitable rubber matrix of the oil- and water-swellable rubber of the present invention is not particularly limited, which may be selected from natural rubber or synthetic rubber. The rubber matrix may be selected from one or more of the nonpolar rubber and/or polar rubber, rubber matrix suitably used in the above oil swellable rubber is applicable to the oil- and water-swellable rubber of the present invention.

Vulcanizing agent and/or vulcanization accelerator suitably used in the oil- and water-swellable rubber of the present invention and their amount are not particularly limited, as long as they can promote the vulcanization of rubber. Vulcanizing agent and/or vulcanization accelerator suitably used in the above oil swellable rubber are applicable to the oil- and water-swellable rubber of the present invention.

Other additives, such as accelerator, plasticizer and filler conventionally used in the manufacture of rubbers may also be used in the present invention according to the applications. Types and amount of these additives are not particularly limited, which may be selected by the ordinary person skilled in the art in accordance with common knowledge. Additives suitably used in the above oil swellable rubber are applicable to the oil- and water-swellable rubber of the present invention.

The oil- and water-swellable rubber of the present invention may further comprises, but not limited to, one or more other additives selected from vulcanizing agent, filler, vulcanization accelerator, plasticizer and other additives. Preferably, vulcanizing agent is contained in 0.3~14 parts by weight, filler is contained in 2~200 parts by weight, vulcanization accelerator is contained in 0.5~10 parts by weight and plasticizer is contained in 0.5~12 parts by weight, based on 100 parts by weight of the rubber matrix.

The oil- and water-swellable rubber-plastic material of the present invention may also comprises, but not limited to, one or more additives selected from vulcanizing agent, filler, accelerator, plasticizer and other additives. For the oil- and water-swellable rubber-plastic material of the present invention, preferably, vulcanizing agent is contained in 0.3~14 parts by weight, filler is contained in 2~200 parts by weight, accelerator is contained in 0.5~10 parts by weight, and plasticizer is contained in 0.5-12 parts by weight, based on 100 parts by weight of the rubber-plastic material matrix.

Types and amounts of these additives are not particularly limited, which may be selected by the ordinary person skilled in the art in accordance with common knowledge.

The present invention also provides a process for preparing the oil- and water-swellable rubber of the present invention, in which the starch/ester graft copolymer of the present invention, water absorbing agent and/or reactive monomer and/or surfactant are directly added to the rubber for mixing and the subsequent vulcanization.

The oil- and water-swellable material, such as swellable rubber or swellable rubber-plastic material may be used in the preparation of sealing articles in various form and shape, such as sealing rings, sealing gaskets, sealing strips, sealing plates, swellable jackets, sealing mandrels and the like. Sealing articles made of the oil swellable material and the oil- and water-swellable material of the present invention can be applied in all aspects in which sealing is required, such as in cementing tools, equipment, pipes, apparatus, meters, subways, tunnels, dams, aqueducts, infrastructure works, construction, mining, water wells, oil wells project and the like.

The oil- and water-swellable material of the present invention may be used for the production of packers, particularly the well packers. One of the packers is composed of a mandrel and a swellable jacket surrounding the mandrel. The swellable jacket is made of the oil- and water-swellable material of the present invention. The mandrel and the swellable jacket may be integrated by cementing and vulcanizing. Alternatively, the mandrel and the swellable jacket may be in a form of an assembly composed of two movable units.

This swellable packer is achieved readily by merely having the mandrel coated by the swellable jacket, without assemblies, movable fittings, particular reinforcement layers and protection layers, and it is not necessary to use ground-to-underground control as well as other auxiliary system. Due to the simple construction and simple process for this swellable packer, its production cost is low. In addition, this swellable packer provides other advantages such as easy installation, low operating cost and energy conservation.

As for the application down in the well, the well packer of the present invention becomes part of the oil extraction pipe, which plays a role in plugging the annular space between the well wall or jackets of the production well and the oil extraction pipe. The oil extraction pipe of the well packer of the present invention is introduced down in the oil production well. When oil, water or oil-water mixture come into contact with the packer, plugging material 1 of the packer self-swells at a high rate as a result of liquid absorption, and thereby the annular space between the well wall or jackets of the production well and the oil extraction pipe is sealed, and selective isolation of the ground layer zone is thus achieved.

PREFERRED EMBODIMENTS OF THE INVENTION

The present invention will be described in details with reference to the following examples and drawings. It should be understood that, however, these examples are described by ways of examples and illustration, and they should not be construed as a limitation to the scope of the present invention.

The following examples 1~8 exemplify the starch-(meth) acrylate graft copolymers of the present invention and the preparation process thereof.

EXAMPLE 1

Preparation of the Starch-(Methyl Acrylate, Ethyl Acrylate, Butyl Acrylate) Tetrabasic Graft Copolymer (SG-MA-EA-BA)

In a 500 ml 4-neck glass flask, 8 g of corn starch, 150 ml of deinoized water are heated up to 70° C. under stirring, then holding the temperature for 20 min for gelatinization, cooling to 50° C., then adding 0.74 g sodium dodecylbenzenesulfonate under stirring, after dissolving completely, cooling to ambient temperature. Monomers MA (4 g), EA (4.7 g) and BA (6 g) were respectively weighed and added to the reaction solution, and then stirring for 15 min. To the reaction solution was added 0.445 g ceric ammonium nitrate under nitrogen atmosphere with stirring, followed by heating up to 40° C., and reacting for 3 h at this temperature for completing of reaction. The solution was then subjected to demulsion using an adequate amount of saturated NaCl solution and iced acetic acid, then rinsing with water to neutral, and washing away any unreacted starting materials, drying to a constant weight and weighing. The elastic polymer was obtained in 80%~90% yield.

Yield=(total weight of the starting materials−weight of the unreacted starting materials)/ total weight of the starting materials 100%

Acetone is a good solvent to polyacrylate and the monomer. Continuous extraction is carried out with acetone for 24 h in a Soxhlet extractor, thereby the monomers of MA, EA and BA ungrafted to the starch, homopolymer and copolymer are dissolved. The remaining polymers were dried at 50° C. until a constant weight was obtained, grafting ratio of 70%~80% was then determined.

Grafting ratio=(total weight of the starting materials−weight of the unreacted starting materials−weight of monomer homopolymer and copolymer)/total weight of the starting materials 100%

Figure 1:
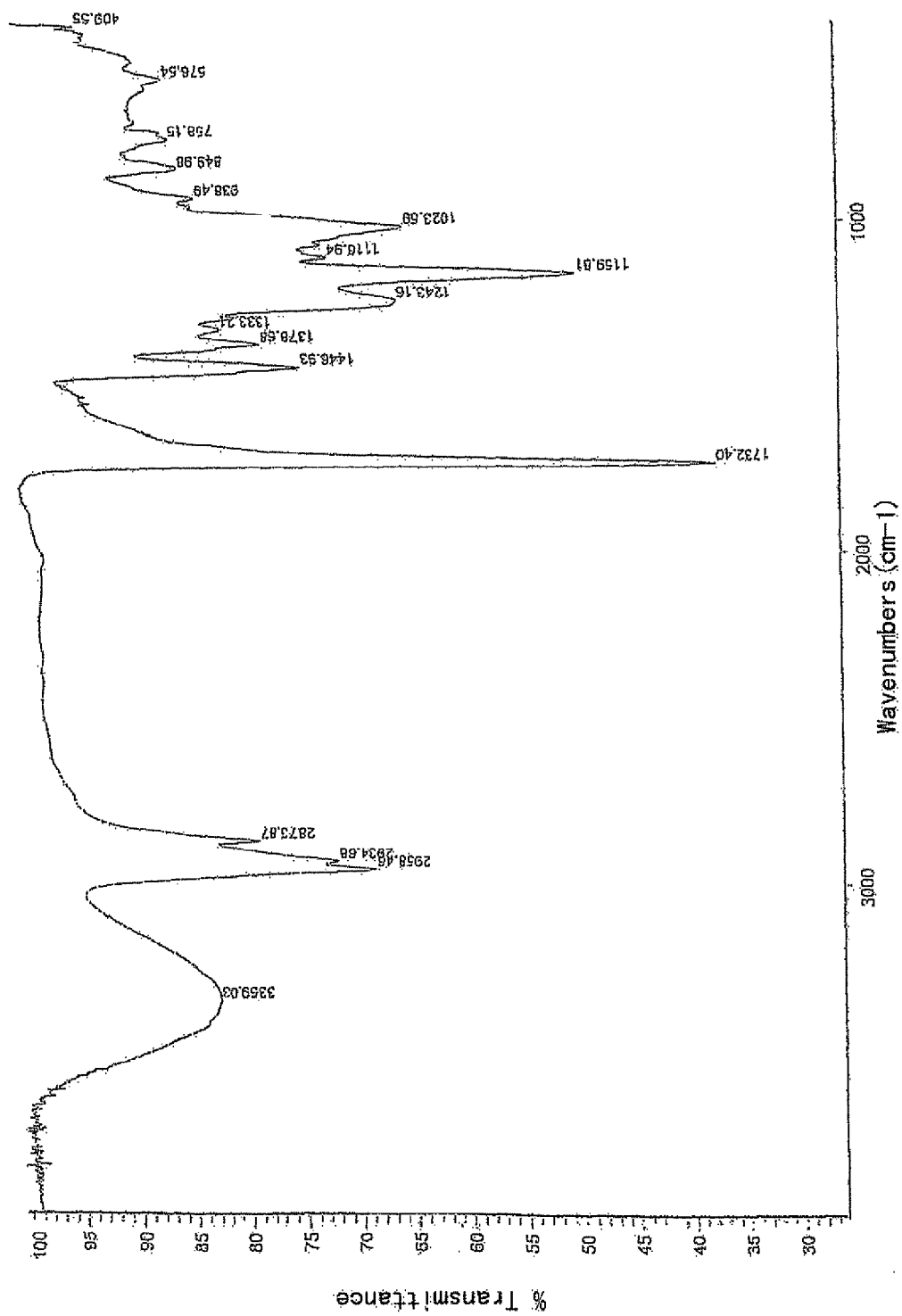
FIG. 1 is an infrared spectrum illustrating the starch-(methyl acrylate, ethyl acrylate, butyl acrylate) tetrabasic graft copolymer of Example 1 of the present invention.

FIG. 1 is an infrared spectrum showing the polymer prepared in this Example, which comprises mainly the following characteristic peaks:

3359.03 $cm^{-1}$ refers to the stretching vibration absorption peak of hydroxyl group (—OH), 2958.46 $cm^{-1}$ refers to the stretching vibration absorption peak of methylene hydrogens (C—H).

1732.40 $cm^{-1}$ refers to the stretching vibration absorption peak of carbonyl group (C═O).

1446.93 $cm^{-1}$ refers to the bending vibration absorption peak of methylene hydrogens (C—$H_2$, C—$H_3$).

1243.16 $cm^{-1}$, and 1159.81 $cm^{-1}$ refer to the stretching vibration absorption peaks of ether bonds (C—O—C).

The above C═O, C—O—C, C—$H_2$, C—$H_3$ absorption peaks correspond to the moiety of methyl acrylate, ethyl acrylate and butyl acrylate, while the absorption peak of —OH is a characteristic peak for starch. Thus, the presence of the above peaks confirmed the occurrence of grafting between the starch and methyl acrylate, ethyl acrylate and butyl acrylate.

EXAMPLE 2

Preparation of the Starch-butyl Acrylate Binary Graft Copolymer (SG-BA)

As prepared in the same manner as Example 1, except that 8 g of Irish potato starch, 180 ml of deinoized water, 1.6 g of sodium dodecyl benzenesulfonate, 32 g of butyl acrylate and 0.98 g of ceric nitrate were used as the starting reactants instead. After polymerization, the product was obtained in 85%~92% yield, and grafting ratio of 73%~84% was determined.

Figure 2:
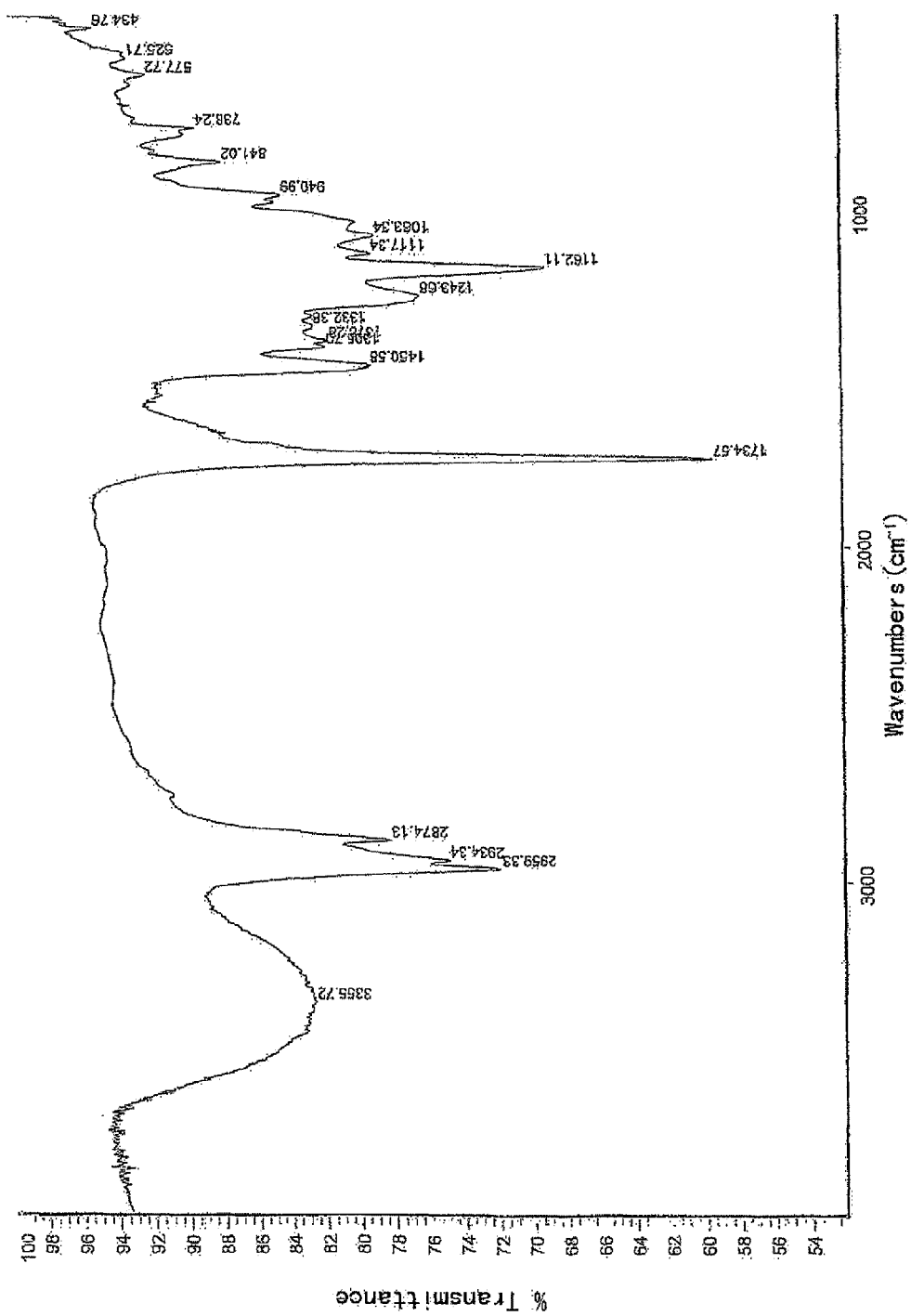
FIG. 2 is an infrared spectrum illustrating the starch-butyl acrylate binary graft copolymer of Example 2 of the present invention.

FIG. 2 is an infrared spectrum showing the polymer prepared in this Example, which comprises mainly the following characteristic peaks:

3359.72 $cm^{-1}$ refers to the stretching vibration absorption peak of hydroxyl group (—OH).

2959.33 $cm^{-1}$ refers to the stretching vibration absorption peak of methylene hydrogens (C—H).

1734.57 $cm^{-1}$ refers to the stretching vibration absorption peak of carbonyl group (C═O).

1450.58 $cm^{-1}$ refers to the bending vibration absorption peak of methylene hydrogens (C—$H_2$, C—$H_3$).

1243.68 $cm^{-1}$ and 1162.11 $cm^{-1}$ refer to the stretching vibration absorption peaks of ether bonds (C—O—C).

The above C═O, C—O—C, C—$H_2$, C—$H_3$ absorption peaks correspond to the moiety of butyl acrylate, while the absorption peak of —OH is a characteristic peak for starch. Thus, the presence of the above peaks confirmed the occurrence of grafting between the starch and butyl acrylate.

EXAMPLE 3

Preparation of the Starch-methyl Methacrylate Binary Graft Copolymer (SG-MA)

As prepared in the same manner as Example 1, except that 9 g of tapioca starch, 190 ml of deinoized water, 2.7 g of sodium dodecyl benzenesulfonate, 51 g of methyl methacrylate and 1.6 g of ceric nitrate were used as the starting reactants instead. After polymerization, the product was obtained in 75%~80% yield, and grafting ratio of 70%~73% was determined.

Figure 3:
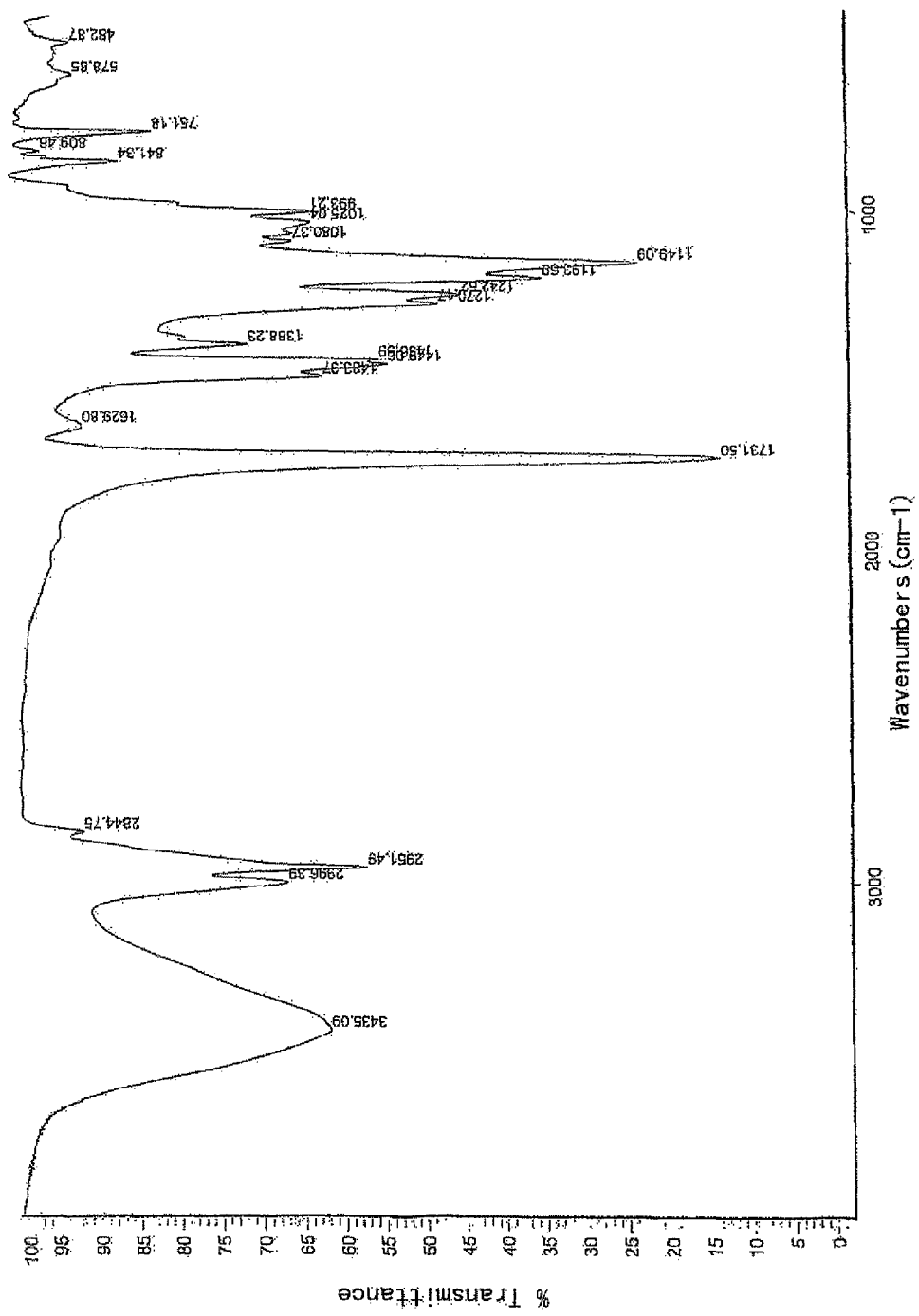
FIG. 3 is an infrared spectrum illustrating the starch-methyl acrylate binary graft copolymer of Example 3 of the present invention.

FIG. 3 is an infrared spectrum showing the polymer prepared in this Example, which comprises mainly the following characteristic peaks:

3435.09 $cm^{-1}$ refers to the stretching vibration absorption peak of hydroxyl group (—OH).

2951.49 $cm^{-1}$ refers to the stretching vibration absorption peak of methylene hydrogens (C—H).

1731.50 $cm^{-1}$ refers to the stretching vibration absorption peak of carbonyl group (C═O).

1449.06 $cm^{-1}$ refers to the bending vibration absorption peak of methylene hydrogens ($CH_2$, $CH_3$).

1242.52 $cm^{-1}$ and 1149.09 $cm^{-1}$ refer to the stretching vibration absorption peaks of ether bonds (C—O—C).

The above C=O, C—O—C, CH₂, CH₃ absorption peaks correspond to the moiety of methyl methacrylate, while the absorption peak of —OH is a characteristic peak for starch. Thus, the presence of the above peaks confirmed the occurrence of grafting between the starch and methyl methacrylate.

EXAMPLE 4

Preparation of the Starch-butyl Methacrylate Crosslinked Copolymer(C-SG-MBA)

10 g of corn starch was weighed, and mixed with 150 ml deinoized water in a four-neck glass flask and stirred for 8 min, followed by heating up to 70° C., holding the temperature for 15 min for gelatinization, then cooling to 50° C., adding 1.8 g of sodium dodecylbenzenesulfonate, 35 g of butyl methacrylate, 1.4 g of potassium persulfate and 0.02 g of N,N'-methylenebisacrylamide under nitrogen atmosphere, heating up to 69° C., and holding the temperature for 4 h for the completing the reaction. Demulsion is carried out by dropwisely adding the solution of $H_2SO_4$ and NaCl to the reaction system, and the product was then filtered, rinsed with water, dried and tested for its properties.

Properties: yield of the graft copolymer >80%

Good absorption to solvents of oils, esters, aromatic hydrocarbons, halogenated hydrocarbons, tetrahydrofuran and the like, Absorption rate to aromatic hydrocarbons (such as toluene, xylene)>15 g/g.

EXAMPLE 5

Preparation of the Starch-ethyl Acrylate-methyl Methacrylate Crosslinked Copolymer (C-SG-EA-MMA)

8 g of Irish potato starch was weighed, and mixed with 120 ml deinoized water in a four-neck flask and stirred for 10 min, followed by heating up to 70° C., holding the temperature for 15 min for gelatinization, then cooling to 50° C., then adding 1.5 g of sodium dodecylbenzenesulfonate, 20 g of ethyl acrylate, 10 g of methyl methacrylate, 1.1 g of ammonium persulfate and 0.015 g of polyethylene glycol diacrylate under nitrogen atmosphere, followed by heating up to 69° C., and holding the temperature for 4 h for completing the reaction. Demulsion is carried out by dropwisely adding iced acetic acid, the product was then filtered, rinsed with water, dried and tested for its properties.

Properties: yield of the graft copolymer >80%

Good absorption to solvents of oils, esters, aromatic hydrocarbons, halogenated hydrocarbons, tetrahydrofuran and the like.

Absorption rate to aromatic hydrocarbons (such as toluene, xylene)>10 g/g.

EXAMPLE 6

Preparation of the Starch-butyl Acrylate Graft Copolymer (SG-BA)

10 g of corn starch was weighed, and mixed with 200 ml of deinoized water in a 500 ml-four-neck glass reaction flask, which was then heated up to 80° C. under stirring, and stirred for another 1 h, then cooling to 45° C., followed by adding 1.5 g of sodium dodecylbenzenesulfonate under stirring. After dissolving completely, the temperature to ambient temperature. 4 g of monomer BA was weighed, and added to the reaction solution, and stirred for 15 min. To the reaction solution was then added 0.64 g of ceric ammonium nitrate under nitrogen atmosphere, followed by heating up to 40° C. under stirring, and holding the temperature for 3 h for completing the reaction. Workup in the same manner as Example 1, the product was dried to a constant weight and then weighed. The yield of 83%~88% was determined, and grafting ratio is then determined as 70%~74%.

EXAMPLE 7

Preparation of the Starch-methyl Acrylate Graft Copolymer (SG-MA)

7 g of corn starch was weighed, and mixed with 280 ml of deinoized water in a 500 ml-four-neck glass reaction flask, which was then heated up to 75° C. under stirring, and kept at this temperature for 1.5 h, then cooling to 55° C., followed by adding 3.4 g of sodium dodecylbenzenesulfonate. After dissolving completely, cooling the temperature to ambient temperature, weighing 56 g of MA and adding to the reaction solution, while stirring for 20 min. To the reaction solution was then added 8.5 g of ceric ammonium nitrate under nitrogen atmosphere, followed by heating up to 50° C. under stirring, and reaction was kept at this temperature for 6 h for completing the reaction. Workup in the same manner as Example 1, the product was obtained in 84%~90% yield, and grafting ratio of 76%~81% was then determined.

EXAMPLE 8

Preparation of the Starch-(Methyl Acrylate, Ethyl Acrylate, Butyl Acrylate) Tetrabasic Graft Copolymer (SG-MA-EA-BA)

12 g of Irish potato starch was weighed, and mixed with 220 ml of deinoized water in a 500 ml-four-neck glass reaction flask, which was then heated up to 80° C. under stirring, holding the temperature while stirring for 20 min for gelatinization, then cooling to 45° C., followed by adding 2.3 g sodium dodecylsulfate (SDS) under stirring. After dissolving completely, cooling the temperature to ambient temperature, then adding 1.4 g ceric ammonium nitrate to the reaction solution, and stirring for 10 min. subsequently, monomers MA (1.5 g), EA (15 g) and B A (30 g) were added under nitrogen atmosphere, followed by heating up to 55° C. under stirring, and holding the temperature for 3.5 h for completing the reaction. Workup in the same manner as Example 1, the product was obtained in >81% yield, and grafting ratio was determined as >70%.

The following examples exemplify the oil swellable rubber and the preparation process thereof.

EXAMPLE 9

After blending 100 parts by weight of natural rubber, 5 parts by weight of zinc oxide, 1.4 parts by weight of stearic acid, 1 part by weight of paraffin, 30 parts by weight of carbon black, 65 parts by weight of calcium carbonate, 20 parts by weight of engine oil, 1.2 parts by weight of N-phenyl-α-naphthylamine, 0.3 parts by weight of 2-mercapto-benzothiazole, 1.2 parts by weight of dibenzothiazole disulfide, 3.5 parts by weight of sulfur, and 40 parts by weight of SG-MMA thoroughly in an open mill or closed mill, vulcanization is carried out via a vulcanizing press to provide a test piece of 2 mm thick.

Condition for vulcanization: 150° C. 30 min 10M Pa.

Rubber test piece was immersed in 20# engine oil for 3 days, swelling rate by weight was found more than 50%. In comparison with the rubber test piece containing no SG-MMA, the swelling rate by weight of the product of the present example was increased by 25%.

EXAMPLE 10

After blending 100 parts by weight of natural rubber, 5 parts by weight of zinc oxide, 1.4 parts by weight of stearic acid, 1 part by weight of paraffin, 30 parts by weight of carbon black, 65 parts by weight of calcium carbonate, 20 parts by weight of engine oil, 1.2 parts by weight of N-phenyl-α-naphthylamine, 1 part by weight of N-(4-phenylaminophenyl)methacrylamide, 0.5 parts by weight of N-(4-phenylaminophenyl)maleimide, 0.3 parts by weight of 2-mercaptobenzothiazole, 1.2 parts by weight of dibenzothiazole disulfide, 3.5 parts by weight of sulfur, 0.5 parts by weight of N,N'-methylenebismaleimide, and 40 parts by weight of SG-MMA thoroughly in an open mill or Closed mill, vulcanization is carried out via a vulcanizing press to provide a test piece of 2 mm thick.

Condition for vulcanization: 150° C. 30 min 10 MPa.

Rubber test piece was immersed in 20<sup>#</sup> engine oil for 3 days, swelling rate by weight was found more than 50%. In comparison with the rubber test piece containing no SG-MMA the swelling rate by weight of the product of the present example was increased by more than 20%.

Examples 11~13 below demonstrate the influence of starch-(meth)acrylate copolymer of the present invention on the swelling properties of rubber in oil compounds, wherein vulcanized hydrogenated nitrile-butadiene rubber (HNBR) was used as the rubber. The test piece was prepared by the following steps:

homogenously mixing 100 parts by weight of rubber, 0.4~12 parts by weight of vulcanizing agent (organic compound) and some swelling agent in sequence at 30° C.~60° C. in an open mill or closed mill; then carrying out vulcanization via a vulcanizing press to provide a test piece of 2 mm thick. Condition for vulcanization: 145° C.~195° C. 0.5 MPa~25 Ma 2 min~65 min.

EXAMPLE 11

Test for the swelling properties of the hydrogenated nitrile-butadiene rubber in coal oil, in which SG-MA-EA-BA copolymer is contained in the rubber as the swelling agent.

Test pieces were prepared as above, which contain 100 parts by weight of hydrogenated nitrile-butadiene rubber, 12 parts by weight of dicumyl peroxide (DCP) and 0 and 15 parts by weight of SG-M-EA-BA, respectively, and the swelling properties of the test pieces were determined.

Test method: test pieces with dimension of about 40 20 2 (mm) were accurately weighed, which were then immersed in coal oil, and taken out for weighing for each 24 h. Before weighing, the oil on the surface was wiped off.

Swelling rate by weight=(weight of the test piece after immersing in oil−weight of the test piece before immersing in oil)/weight of the test piece before immersing in oil 100%

Test results:

TABLE 1

Swelling rate of the rubber in Example 9 after absorption of coal oil

| SG-MA-EA-BA (parts by weight) | 0 | 15 |
|---|---|---|
| Swelling rate on Day 9 (%) | 35 | 45.3 |

EXAMPLE 12

Test for the swelling properties of the hydrogenated nitrile-butadiene rubber in coal oil, in which SG-BG copolymer is contained as the swelling agent.

Test piece was prepared as above, which contains 100 parts by weight of hydrogenated nitrile-butadiene rubber, 1 part by weight of dicumyl peroxide (DCP), 1 part by weight of sulfur, 3 parts by weight of dibenzoyl peroxide (BPO) and 0, 5, 15, and 20 parts by weight of SG-BG, respectively. The test pieces were labeled as SG-BA-A, SG-BA-B, SG-BA-C, SG-BA-D, respectively. Swelling properties were measured in the same manner of Example 6.

TABLE 2

Swelling rate by weight of the rubber in Example 12 after absorption of coal oil

| | Test pieces | | | |
|---|---|---|---|---|
| | SG-BA-A | SG-BA-B | SG-BA-C | SG-BA-D |
| Swelling rate on Day 12 (%) | 36 | 42.3 | 55.6 | 72.2 |

EXAMPLE 13

Test for the swelling properties of the hydrogenated nitrile-butadiene rubber in crude oil, in which SG-BA copolymer is contained as swelling agent.

Test piece was prepared as above, which contains 100 parts by weight of hydrogenated nitrile-butadiene rubber, 1 part by weight of sulfur, 2 parts by weight of dicumyl peroxide, and 25 parts by weight of SG-BA. The piece is immersed in crude oil at 40-50° C. for 2 days. Swelling rate by weight of >90% was determined.

By the results of Examples 6-10, it is demonstrated that the oil swelling rate partially depends on the following factors: less amount of crosslinkers which facilitates oil absorption and swelling; high immersion temperature which facilitates oil absorption and swelling; diluted oil with low viscosity which facilitates oil absorption and swelling; more amount of swelling agent used which facilitates oil absorption and swelling; and rubber and oil with similar polarity which facilitate swelling. Otherwise, swelling becomes unfavorable.

Examples 14~15 below exemplify the preparation process for the well packer of the present invention and the test results for the swelling properties of the well packer.

EXAMPLE 14

Preparation of Packer

The hollow mandrel was demulsified with alkali solution, followed by washing, phosphorizing, rinsing, drying at 150° C. for 30 min, cooling to room temperature, coating with CHEMLOK adhesive, and then left for later use.

Figure 4A:
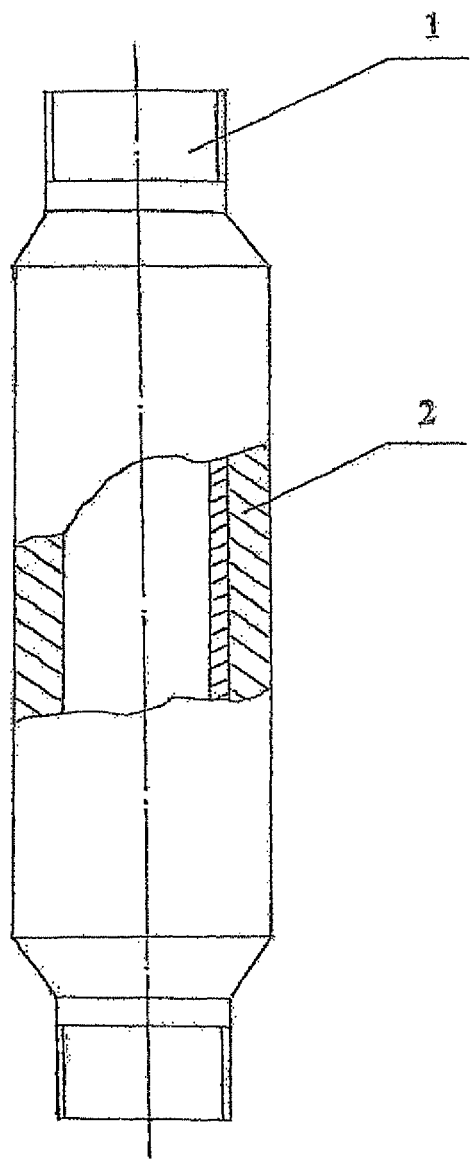
FIGS. 4A~4B are the sectional views of the structure of the well packer of the present invention.
Figure 4B:
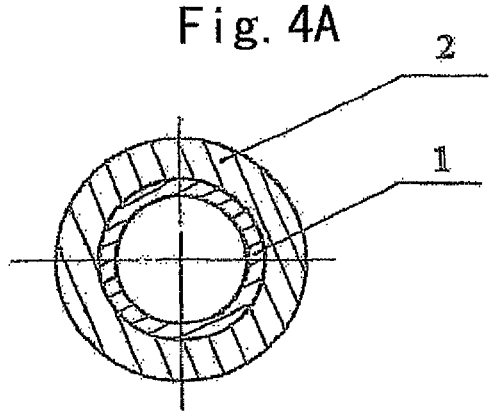

Adding 60 parts by weight of hydrogenated nitrile-butadiene rubber (HNBR), 40 parts by weight of ethylene propylene diene terpolymer (EPDM), 30 parts by weight of SG-BA, 50 parts by weight of general purpose carbon black, 0.5 parts by weight of stearic acid, 0.5 parts by weight of zinc stearate, 5 parts by weight of zinc oxide, 0.5 parts by weight of N,N'-methylenebismaleimide, 10 parts by weight of white carbon black, 10 parts by weight of talc, 1 part by weight of aliphatic hydrocarbon-cycloalkane-aromatic hydrocarbons resin mixtures, 0.5 parts by weight of N-(4-phenylaminophenyl)maleimide, 0.5 parts by weight of N-(4-phenylaminophenyl)methacrylamide, 1.0 part by weight of N-isopropyl-N'-methylphenyl p-phenylenediamine (4010NA), 1.0 part by weight of N-phenyl-β-naphthylamine, 0.6 parts of tetramethyl thiuram disulfide (TMTD), 0.5 parts by weight of N-cyclohexyl-2-benzothiazolesulfenamide (CZ), 0.5 parts by weight of diphenylguanidine (D), 0.5 parts by weight of 2-mercapto-benzothiazole (M), 1 part by weight of sulfur, 3 parts by weight of dibenzoyl peroxide (BPO), and 1 part by weight of dicumyl peroxide DCP) to an open mill, and then rubber mixing at 30° C.~65° C. for 5 min~70 min. The homogenously mixed rubber was applied to the mandrel coated with adhesives, and the thickness of the rubber depends on the particular application. Appearance of the packer is shown in FIGS. 4A and 4B. In the vulcanizing press or vulcanizing boiler, vulcanization was conducted according to the conventional process for rubber vulcanization, in which vulcanization was conducted at 145° C. ~195° C. under a pressure of 0.5 MPa~25 MPa for 2 min~65 min.

As shown in FIGS. 4A and 4B, the well packer prepared from the above process comprises hollow mandrel 1 and plugging material 2 surrounding the hollow mandrel. The plugging material 2 is made of the above oil swellable rubber, and plugging material 2 and hollow mandrel 1 were integrated together by cementing and vulcanizing, or were formed as an assembly composed of two movable units.

The tensile strength of the test piece for plugging material 2 is up to 5~15 MPa (in accordance with the test of GB/528).

EXAMPLE 15

Test for the swelling properties of the plugging material of example 14 in crude oil.

Test piece with dimensions of (40 20 2 (mm)) was prepared using the plugging material formulation and process parameter of Example 9, which was then accurately weighed, and immersed in crude oil which was extracted down from the well. The test piece was taken out for weighing at a time interval. Before weighing, the oil covering the surface of the test piece was wiped off with filter paper.

> Swelling rate by weight=(weight of the test piece after immersing in oil−weight of the test piece before immersing in oil)/weight of the test piece before immersing in oil 100%

Test results:

The test pieces were initially immersed in crude oil at 100° C.~120° C. for 2.5 h, then cooling the oil to room temperature and keeping immersing for 18 h. The swelling rate by weight was then determined as >80%. When the test pieces were subjected to immersion in crude oil at 100° C.~120° C. for another 6.5 h, the swelling rate by weight become >102%. After another 64 h immersion in cool oil, i.e., totally 9 h in hot oil and another 82 h in cool oil, the swelling rate by weight become >110%.

It shows that higher swelling rate can be achieved when the packer of the present invention is immersed in crude oil, by which the sealing of the annular space between the mandrel and the jackets or the well wall can be achieved. Further, the plugging material exhibits excellent heat resistance, pressure resistance and the like, with which the erosion caused by the harsh working environment down in the well can be prevented.

The following examples exemplify the oil- and water-swellable material of the present invention and the preparation process thereof.

EXAMPLE 16

13 parts by weight of hydrogenated nitrile-butadiene rubber, 25 parts by weight of nitrile-butadiene rubber, 62 parts by weight of ethylene propylene rubber, 33 parts by weight of starch/(methyl methacrylate and ethyl methacrylate) non-crosslinked graft copolymer, 0.5 parts by weight of sulfur, 2 parts by weight of dibenzoyl peroxide, 0.5 parts by weight of N,N'-methylenebismaleimide, 0.5 parts by weight of 2-mercapto-benzothiazole, 1.5 parts by weight of N-cyclohexyl-2-benzothiazolesulfenamide, 1 part by weight of stearic acid, 0.5 parts by weight of zinc stearate, 15 parts by weight of carbon black, 9 parts by weight of white carbon black, 3 parts by weight of Pot clay, 2 parts by weight of mica powder, 2 parts by weight of titanium dioxide, 3 parts by weight of magnesia, 3 parts by weight of zinc oxide, 1 part by weight of paraffin, 1 part by weight of coumarone, 1 part by weight of N-cyclohexyl-p-methoxyaniline, 1 part by weight of 1,2-dihydro-2,2,4-trimethylquinoline polymer, 1 part by weight of N-isopropyl-N'-diphenyl-p-phenylenediamine, 2 parts by weight of chlorinated polyethylene, 40 parts by weight hydroxymethyl cellulose 10 parts by weight of hydroxyethyl cellulose, 5 parts by weight hydroxymethyl ethyl cellulose, 1 part by weight of acrylic acid, 1 part by weight of N,N-dimethacrylamide, 12 parts by weight of sodium dodecyl sulfate, and 13 parts by weight of sodium dodecyl sulfonate were subjected to rubber mixing in an open mill or Closed mill at 44~45° C. for 9~15 min (roller distance varies from 4-6 mm to 1-2 mm which makes the product thinner). The pressed product was then taken off from the open mill, and left for cooling.

The products thus obtained were kept at room temperature for 17 h, and then introduced into a mold, and subjected to molding using a vulcanizing press, and kept at 170° C. 20 min 10 MPa to give the test piece of WOSR.

Swelling rate by weight: >200% in the case that the test pieces immersed in deionized water at room temperature for 10 days
>110% in the case that the test pieces immersed in crude oil at 140° C. for 24 h, and then subjected to cool by immersion at room temperature for 6 days.

EXAMPLE 17

25 parts of HNBR, 60 parts of EPDM 15 parts of NBR, 60 parts of CMC, 2.5 parts of DCP, 13 parts of carbon black, 1 part of stearic acid, 1 part of zinc stearate, 1 part of N-(4-phenylaminophenyl)methacrylamide, 1 part of diphenyl guanidine, 1 part of N-cyclohexyl-2-benzothiazolesulfenamide, 2 parts of aliphatic hydrocarbon-cycloalkane-aromatic hydrocarbons resin mixtures, 1 part of N-phenyl-β-naphthylamine, 0.5 parts of N-isopropyl-N'-phenyl-p-phenylenediamine, 5 parts of MgO, 5 parts of ZnO, 11 parts of white carbon black, 8 parts of SDBS, 1.5 parts of NMA, and 30 parts of swelling agent SG-BA (prepared as above or see patent application no.: CN 200510137574.4) were subjected to rubber mixing in an open mill or Closed mill at 50~55° C. for 10~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min. 10 MPa to give the test piece of WOSR.

Swelling rate by weight: >190 in the case that the test pieces immersed in crude oil at 140° C. for 24 h, and then subjected to cool by immersion at room temperature for 9 days
>210 in the case that the test pieces immersed in deionized water at room temperature for 12 days

EXAMPLE 18

25 parts of HNBR, 50 parts of EPDM 25 parts of NBR, 45 parts of CMC, 2.5 parts of DCP, 13 parts of carbon black, 1 part of stearic acid, 1 part of zinc stearate, 1 part of N-(4-phenylaminophenyl)maleimide, 1 part of 2-mercapto-benzothiazole, 1 part of tetramethyl thiuram disulfide, 1 part of N-phenyl-β-naphthylamine, 5 parts of MgO, 5 parts of ZnO, 11 parts of white carbon black, 8 parts of SDBS, 1.5 parts of NMA, and 30 parts of swelling agent SG-BA (prepared as above or see patent application no.: CN 200510137574.4) were subjected to rubber mixing in an open mill or Closed mill at 50~55° C. for 10~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at170° C. 20 min 10 MPa to give the test piece of WOSR.

Swelling rate by weight: >190 in the case of the test pieces immersed in oil at 140° C. for 28 h, and then subjected to cool by immersion at room temperature for 13 days
>220 in the case of the test pieces immersed in deionized water at room temperature for 10 days

EXAMPLE 19

25 parts of HNBR, 30 parts of EPDM, 45 parts of NBR, 30 parts of CMC, 2.5 parts of DCP, 13 parts of carbon black, 1 part of stearic acid, 1 part of zinc stearate, 1 part of N,N'-m-phenylenebismaleimide, 1 part of 2-mercapto-benzothiazole, 1 part of diphenyl guanidine, 2 parts of aliphatic hydrocarbon-cycloalkane-aromatic hydrocarbons resin mixtures, 1 part of antioxidant D, 5 parts of MgO, 5 parts of ZnO, 11 parts of white carbon black, 8 parts of sodium dodecyl benzenesulfonate, 1.5 parts of NMA, and 10 parts of swelling agent SG-BA (prepared as above or see patent application no.: 200510137574.4) were subjected to rubber mixing in an open mill or Closed mill at 50~55° C. for 10~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.

Swelling rate by weight: >80 in the case of the test pieces immersed in crude oil at 140° C. for 24 h, and then subjected to cool by immersion at room temperature for 9 days
>110 in the case of the test pieces immersed in deionized water at room temperature for 12 days

EXAMPLE 20

As prepared in the same manner of Example 4 (see patent of oil swellable rubber, P11, Example 4), except that 25 parts of HNBR, 25 parts of EPDM, 5 pans of SG-BA, 50 parts of NBR, 2 parts of sodium dodecyl benzenesulfonate, 3 parts of CMC, 3 parts of DCP, 10 parts of carbon black, and 0 parts of NMA were used. Swelling rate by weight was determined as >70% in the case that the test pieces immersed in crude oil at 140° C. for 24 h, and then subjected to cool by immersion for 9 days; while in the case that the test pieces immersed in deionized water at room temperature for 12 days, the swelling rate by weight was determined as >35%.

EXAMPLE 21

As prepared in the same manner of Example 4, except that 97 parts of NBR, 3 parts of EPDM, 10 parts of BPO, 6 parts of white carbon black, 100 parts of CMC, 5 parts of SG-MMA, 30 parts of NMA and 70 parts of SDBS were used. Swelling rate by weight was determined as >10% for the test pieces immersed in crude oil for 12 days; while for the test pieces immersed in deionized water at room temperature for 5 days, the swelling rate by weight was determined as >50%.

EXAMPLE 22

As prepared in the same manner of Example 4, except that 100 parts of EPDM, 40 parts of SG-MMA, 3 parts of CMC, 3 parts of DTBP, 0.5 parts of NMA, 8 parts of SDBS, and 6 parts of white carbon black were used. Swelling rate by weight was determined as >250% in the case of the test pieces immersed in crude oil with heating at 140° C. for 18 h, and then subjected to cool by immersion for 3 days; while in the case of the test pieces immersed in deionized water at room temperature for 48 h, the swelling rate by weight was determined as >20%.

EXAMPLE 23

As prepared in the same manner of Example 4, except that 65 parts of EPDM, 35 parts of NBR, 20 parts of carbon black, 44 parts of carboxylmethyl ethyl cellulose, 3.3 parts of acrylamide, 2.5 parts of DTBD, 5 parts of SG-A-BA were used. Swelling rate by weight was determined as >20% in the case of the test pieces immersed in deionized water for days; while in the case of the test pieces immersed in crude oil with heating at 140° C. for 8 h, and then subjected to cool by immersion at room temperature for 3 days, the swelling rate by weight was determined as >95%.

EXAMPLE 24

65 parts by weight of hydrogenated nitrile-butadiene rubber, 10 parts by weight of nitrile-butadiene rubber, 25 parts by weight of ethylene propylene diene terpolymer, 15 parts by weight of starch/(methyl methacrylate, ethyl methacrylate, and butyl methacrylate) non-crosslinked graft copolymer, 0.5 parts by weight of sulfur, 2 parts by weight of dicumyl peroxide, 2 parts by weight of zinc stearate, 1.5 parts by weight of dibenzothiazole disulfide, 1 part by weight of N,N'-m-phenylenebismaleimide, 0.5 parts by weight of tetramethyl thiuram disulfide, 0.5 parts by weight of 2-mercapto-benzothiazole, 10 parts by weight of carbon black, 7 parts by weight of white carbon black, 5 parts by weight of Pot clay, 5 parts by weight of mica powder, 7 parts by weight of titanium dioxide, 3 parts by weight of magnesia, 3 parts by weight of zinc oxide, 1 part by weight of paraffin, 0.5 parts by weight of rosin, 2 parts by weight of coumarone, 1 part by weight of N-phenyl-β-naphthylamine, 2 parts by weight of N-cyclohexyl-p-methoxyaniline, 0.5 parts by weight of N-4-(phenylaminophenyl)methacrylamide, 0.6 parts by weight of 1,2-dihydro-2,2,4-trimethylquinoline polymer, 0.5 parts by weight of N-(4-phenylaminophenyl) maleimide, 3 parts by weight of chlorinated polyethylene, 2 parts by weight of chlorinated polyvinyl chloride, 1 part by weight of aliphatic hydrocarbon-cycloalkane-aromatic hydrocarbons resin mixtures, 20 parts by weight of carboxylmethyl cellulose, 10 parts by weight of hydroxyethyl cellulose, 10 parts by weight hydroxymethyl ethyl cellulose, 1 part by weight of N,N-dimethacrylamide, 4 parts by weight of N-hydroxymethyl acrylamide, 17 parts by weight of sodium dodecyl sulfate, and 7 parts by weight of cetyl polyoxyethylene ether were subjected to rubber mixing in an open mill or Closed mill at 45~50° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.
  Swelling rate by weight: >90% in the case of the test pieces immersed in deionized water at room temperature for 10 days
    >75% in the case of the test pieces immersed in crude oil at 140° C. for 24 h, and then subjected to cool by immersion at room temperature for 5 days.

EXAMPLE 25

10 parts by weight of hydrogenated nitrile-butadiene rubber, 48 parts by weight of nitrile-butadiene rubber, 25 parts by weight of ethylene propylene diene terpolymer, 22 parts by weight of ethylene propylene rubber, 35 parts by weight of starch/(methyl methacrylate and butyl methacrylate) non-crosslinked graft copolymer, 2 parts by weight of dicumyl peroxide, 1 part by weight of dibenzoyl peroxide, 0.5 parts by weight of N,N'-m-phenylenebismaleimide, 3 parts by weight of tetramethyl thiuram disulfide, 1 part by weight of N-cyclohexyl-2-benzothiazolesulfenamide, 1 parts by weight of zinc stearate, 10 parts by weight of carbon black, 11 parts by weight of white carbon black, 2 parts by weight of mica powder, 2 parts by weight of titanium dioxide, 5 parts by weight of magnesia, 5 parts by weight of zinc oxide, 1 part by weight of paraffin, 1 part by weight of rosin, 1 part by weight of N-cyclohexyl-p-methoxyaniline, 1 part by weight of 1,2-dihydro-2,2,4-trimethylquinoline polymer, 1 part by weight of N-isopropyl-N'-diphenyl-p-phenylenediamine, 0.5 parts by weight of N-(4-phenylaminophenyl) maleimide, 1 part by weight of chlorinated polyethylene, 0.5 parts by weight of chlorinated polyvinyl chloride, 0.5 parts by weight of aliphatic hydrocarbon-cycloalkane-aromatic hydrocarbons resin, mixtures, 20 parts by weight of carboxylmethyl cellulose, 10 parts by weight of hydroxyethyl cellulose, 10 parts by weight hydroxymethyl ethyl cellulose, 1 part by weight of N,N-dimethacrylamide, 2 parts by weight of N-hydroxymethyl acrylamide, 5 parts by weight of sodium dodecyl sulfate, 5 parts by weight of sodium dodecyl benzenesulfonate, 7 parts by weight of sodium dodecyl sulfonate and 3 parts by weight of cetyl polyoxyethylene ether were subjected to rubber mixing in an open mill or Closed mill at 45~50° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.
  Swelling rate by weight: >110% in the case of the test pieces immersed in deionized water at room temperature for 12 days
    >70% in the case of the test pieces immersed in crude oil at 140° C. for 24 h, and then subjected to cool by immersion at room temperature for 7 days.

EXAMPLE 26

35 parts by weight of hydrogenated nitrile-butadiene rubber, 35 parts by weight of nitrile-butadiene rubber, 15 parts by weight of ethylene propylene diene terpolymer, 15 parts by weight of ethylene propylene rubber, 35 parts by weight of starch/methyl methacrylate non-crosslinked graft copolymer, 2 parts by weight of dicumyl peroxide, 1 part by weight of dibenzoyl peroxide, 0.5 parts by weight of N,N'-m-phenylenebismaleimide, 0.5 parts by weight of tetramethyl thiuram disulfide, 1 part by weight of 2-mercapto-benzothiazole, 2 parts by weight of N-cyclohexyl-2-benzothiazolesulfenamide, 1 parts by weight of stearic acid, 1 parts by weight of zinc stearate, 13 parts by weight of carbon black, 13 parts by weight of white carbon black, 2 parts by weight of Pot clay, 1 part by weight of mica powder, 4 parts by weight of magnesia, 4 parts by weight of zinc oxide, 1 part by weight of rosin, 2 parts by weight of coumarone, 0.5 parts by weight of dibutyl phthalate, 0.5 parts by weight of 3-hydroxybutyraldehyde-α-naphthylamine, 0.5 parts by weight of N-phenyl-β-naphthylamine, 1 part by weight of thio-bis(di-sec-amylphenol), 1 part by weight of 1,2-dihydro-2,2,4-trimethylquinoline polymer, 1 part by weight of N-isopropyl-N'-diphenyl-p-phenylenediamine, 1 part by weight of chlorinated polyethylene, 1 part by weight of chlorinated polyvinyl chloride, 1 part by weight of aliphatic hydrocarbons-cycloalkanes-aromatic hydrocarbons resin mixtures, 60 parts by weight of carboxylmethyl cellulose, 10 parts by weight of hydroxyethyl cellulose, 10 parts by weight carboxylmethyl hydroxyethyl cellulose, 10 parts by weight of hydroxypropyl cellulose, 1 part by weight of acrylic acid, 5 parts by weight of N,N-dimethacrylamide, 1 part by weight of N-hydroxymethyl acrylamide, 20 parts by weight of sodium dodecyl sulfate, 10 parts by weight of sodium dodecyl benzenesulfonate and 10 parts by weight of cetyl polyoxyethylene ether were subjected to rubber mixing in an open mill or Closed mill at 45~50° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.
  Swelling rate by weight: >80% in the case of the test pieces immersed in deionized water at room temperature for 2 days
    >70% in the case of the test pieces immersed in crude oil at 140° C. for 24 h, and then subjected to cool by immersion at room temperature for 6 days

EXAMPLE 27

10 parts by weight of hydrogenated nitrile-butadiene rubber, 70 parts by weight of ethylene propylene diene terpolymer, 10 parts by weight of ethylene propylene rubber, 10 parts by weight of chloroprene rubber, 35 parts by weight of starch/ butyl methacrylate non-crosslinked graft copolymer, 0.5 parts by weight of sulfur, 1 part by weight of dicumyl peroxide, 1 part by weight of di-tert-butyl peroxide, 0.5 parts by weight of N,N'-m-phenylenebismaleimide, 0.5 parts by weight of tetramethyl thiuram disulfide, 0.5 parts by weight of 2-mercapto-benzothiazole, 0.5 parts by weight of N-cyclohexyl-2-benzothiazolesulfenamide, 1.5 parts by weight of stearic acid, 0.5 parts by weight of zinc stearate, 6 parts by weight of carbon black, 8 parts by weight of white carbon black, 3 parts by weight of pot clay, 1 part by weight of talc powder, 1 part by weight of mica powder, 3 parts by weight of magnesia, 3 parts by weight of zinc oxide, 1 part by weight of paraffin, 1 part by weight of coumarone, 1 part by weight of dibutyl phthalate, 0.5 parts by weight of N-phenyl-β-naphthylamine, 0.5 parts by weight of N-cyclohexyl-p-methoxyaniline, 0.5 parts by weight of N-(4-phenylaminophenyl)maleimide, 0.5 parts by weight of N-isopropyl-N'-diphenyl-p-phenylenediamine, 0.5 parts by weight of N-4-(phenylaminophenyl)methacrylamide, 1 part by weight of chlorinated polyethylene, 1 part by weight of chlorinated polyvinyl chloride, 0.5 parts by weight of aliphatic hydrocarbons-cycloalkanes-aromatic hydrocarbons resin mixtures, 10 parts by weight of carboxymethyl cellulose, 10 parts by weight of hydroxyethyl cellulose, 10 parts by weight hydroxymethyl ethyl cellulose, 10 parts by weight of carboxymethylhydroxyethyl cellulose, 1 part by weight of acrylic acid, 2 parts by weight of N,N-dimethacrylamide, 3 parts by weight of N-hydroxymethyl acrylamide, 12 parts by weight of sodium dodecyl sulfate, 4 parts by weight of sodium dodecyl benzenesulfonate, 2 parts by weight of sodium dodecyl sulfonate and 2 parts by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.
Swelling rate by weight: >35% in the case of the test pieces immersed in deionized water at room temperature for 2 days
>190% in the case of the test pieces immersed in crude oil with heating at 140° C. for 24 h, and then subjected to cool by immersion at room temperature for 6 days

EXAMPLE 28

30 parts by weight of hydrogenated nitrile-butadiene rubber, 25 parts by weight of nitrile-butadiene rubber, 20 parts by weight of ethylene propylene diene terpolymer, 20 parts by weight of ethylene propylene rubber, 5 parts by weight of natural rubber, 33 parts by weight of starch/(ethyl, butyl) acrylate non-crosslinked graft copolymer, 1 part by weight of sulfur, 1 part by weight of dicumyl peroxide, 1 part by weight of di-tert-butyl peroxide, 1 part by weight of dibenzothiazole disulfide, 0.5 parts by weight of tetramethyl thiuram disulfide, 0.5 parts by weight of 2-mercapto-benzothiazole, 0.5 parts by weight of N-cyclohexyl-2-benzothiazolesulfenamide, 0.5 parts by weight of diphenyl guanidine, 1 part by weight of stearic acid, 1 part by weight of zinc stearate, 10 parts by weight of carbon black, 5 parts by weight of white carbon black, 2 parts by weight of Pot clay, 2 parts by weight of titanium dioxide, 5 parts by weight of magnesia, 5 parts by weight of zinc oxide, 0.5 parts by weight of paraffin, 0.5 parts by weight of rosin, 0.5 parts by weight of coumarone, 0.5 parts by weight of N-phenyl-β-naphthylamine, 0.5 parts by weight of N-cyclohexyl-p-methoxyaniline, 0.5 parts by weight of thio-bis(di-sec-amylphenol), 0.5 parts by weight of 1,2-dihydro-2,2,4-trimethylquinoline polymer, 0.5 parts by weight of N-isopropyl-N'-diphenyl-p-phenylenediamine, 1 part by weight of chlorinated polyethylene, 1 part by weight of chlorinated polyvinyl chloride, 30 parts by weight of carboxymethyl cellulose, 10 parts by weight of hydroxyethyl cellulose, 10 parts by weight of carboxymethylhydroxyethyl cellulose, 5 parts by weight of hydroxypropyl cellulose, 2 parts by weight of acrylic acid, 5 parts by weight of N,N-dimethacrylamide, 5 parts by weight of N-hydroxymethyl acrylamide, 3 parts by weight of sodium dodecyl sulfate, 2 parts by weight of sodium dodecyl benzenesulfonate, 2 parts by weight of sodium dodecyl sulfonate and 3 parts by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.
Swelling rate by weight: >40% in the case of the test pieces immersed in deionized water at room temperature for 2 days
>150% in the case of the test pieces immersed in crude oil at 140° C. for 24 h, and then subjected to cool by immersion at room temperature for 10 days

EXAMPLE 29

80 parts by weight of hydrogenated nitrile-butadiene rubber, 12 parts by weight of nitrile-butadiene rubber, 5 parts by weight of ethylene propylene diene terpolymer, 3 parts by weight of ethylene propylene rubber, 6 parts by weight of starch/ethyl methacrylate crosslinked graft copolymer, 2 parts by weight of di-tert-butyl peroxide, 5 parts by weight of dibenzoyl peroxide, 0.5 parts by weight of dibenzothiazole disulfide, 0.5 parts by weight of N,N'-m-phenylenebismaleimide, 1 part by weight of 2-mercapto-benzothiazole, 1 part by weight of N-cyclohexyl-2-benzothiazolesulfenamide, 1 part by weight of stearic acid, 2 parts by weight of zinc stearate, 5 parts by weight of carbon black, 5 parts by weight of white carbon black, 2 parts by weight of titanium dioxide, 3 parts by weight of magnesia, 3 parts by weight of zinc oxide, 1 part by weight of paraffin, 1 part by weight of dibutyl phthalate, 0.5 parts by weight of N-phenyl-β-naphthylamine, 1 part by weight of N-cyclohexyl-p-methoxyaniline, 0.5 parts by weight of N-(4-phenylaminophenyl)maleimide, 0.5 parts by weight of N-4-(phenylaminophenyl)methacrylamide, 0.5 parts by weight of thio-bis(di-sec-amylphenol), 0.5 parts by weight of 1,2-dihydro-2,2,4-trimethylquinoline polymer, 1 part by weight of N-isopropyl-N'-diphenyl-p-phenylenediamine, 1 part by weight of chlorinated polyethylene, 1 part by weight of aliphatic hydrocarbons-cycloalkanes-aromatic hydrocarbons resin mixtures, 4 parts by weight of carboxymethyl cellulose, 4 parts by weight of hydroxyethyl cellulose, 3 parts by weight of carboxymethylhydroxyethyl cellulose, 3 parts by weight of hydroxypropyl cellulose, 1 part by weight of acrylic acid, 2 parts by weight of N,N-dimethacrylamide, 3 parts by weight of N-hydroxymethyl acrylamide, 1 part by weight of sodium dodecyl sulfate, 1 part by weight of sodium dodecyl benzenesulfonate, 1 part by weight of sodium dodecyl sulfonate and 1 part by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.

Swelling rate by weight: >30% in the case of the test pieces immersed in deionized water at room temperature for 2 days
>8% in the case of the test pieces immersed in crude oil at 140° C. for 24 hi, and then subjected to cool by immersion at room temperature for 12 days

EXAMPLE 30

10 parts by weight of hydrogenated nitrile-butadiene rubber, 20 parts by weight of nitrile-butadiene rubber, 60 parts by weight of ethylene propylene diene terpolymer, 5 parts by weight of ethylene propylene rubber, 5 parts by weight of vinyl acetate, 40 parts by weight of starch/methyl methacrylate crosslinked graft copolymer, 1 part by weight of sulfur, 2 parts by weight of dicumyl peroxide, 1.5 parts by weight of dibenzoyl peroxide, 2 parts by weight of dibenzothiazole disulfide, 0.5 parts by weight of tetramethyl thiuram disulfide, 0.7 parts by weight of N-cyclohexyl-2-benzothiazolesulfenamide, 0.5 parts by weight of N,N'-m-phenylenebismaleimide, 5 parts by weight of diphenyl guanidine, 1 part by weight of stearic acid, 1 part by weight of zinc stearate, 16 parts by weight of carbon black, 5 parts by weight of mica powder, 16 parts by weight of titanium dioxide, 3 parts by weight of magnesia, 3 parts by weight of zinc oxide, 0.5 parts by weight of paraffin, 1 part by weight of coumarone, 1 part by weight of dibutyl phthalate, 3 parts by weight of N-cyclohexyl-p-methoxyaniline, 3 parts by weight of thio-bis(di-sec-amylphenol), 3 parts by weight of 1,2-dihydro-2,2,4-trimethylquinoline polymer, 1 part by weight of N-isopropyl-N'-diphenyl-p-phenylenediamine, 2 parts by weight of chlorinated polyethylene, 1 part by weight of aliphatic hydrocarbons-cycloalkanes-aromatic hydrocarbons resin mixtures, 5 parts by weight of carboxymethyl cellulose, 5 parts by weight of hydroxyethyl cellulose, 16 parts by weight of carboxymethylhydroxyethyl cellulose, 1 part by weight of N,N-dimethacrylamide, 1 part by weight of N-hydroxymethyl acrylamide, 7 parts by weight of sodium dodecyl sulfate, 2 parts by weight of sodium dodecyl benzenesulfonate, 3 parts by weight of sodium dodecyl sulfonate and 5 parts by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.

Swelling rate by weight: >30% in the case of the test pieces immersed in deionized water at room temperature for 2 days
>90% in the case of the test pieces immersed in crude oil at 140° C. for 24 h, and then subjected to cool by immersion at room temperature for 4 days

EXAMPLE 31

52 parts by weight of nitrile-butadiene rubber, 23 parts by weight of ethylene propylene rubber, 5 parts by weight of natural rubber, 5 parts by weight of chloroprene rubber, 10 parts by weight of chlorosulfonated polyethylene rubber, 5 parts by weight of ethylene-vinyl acetate resin, 18 parts by weight of starch/butyl methacrylate crosslinked graft copolymer, 1 part by weight of sulfur, 1 part by weight of dicumyl peroxide, 1 part by weight of dibenzoyl peroxide, 2 parts by weight of N,N'-m-phenylenebismaleimide, 1 part by weight of tetramethyl thiuram disulfide, 2 parts by weight of 2-mercapto-benzothiazole, 1 part by weight of N-cyclohexyl-2-benzothiazolesulfenamide, 1 part by weight of stearic acid, 1 part by weight of zinc stearate, 8 parts by weight of carbon black, 6 parts by weight of white carbon black, 2 parts by weight of mica powder, 2 parts by weight of titanium dioxide, 3 parts by weight of magnesia, 1 part by weight of zinc oxide, 0.5 parts by weight of rosin, 1 part by weight of coumarone, 1 part by weight of dibutyl phthalate, 1 part by weight of 3-hydroxybutyraldehyde-α-naphthylamine, 1 part by weight of N-phenyl-β-naphthylamine, 1 part by weight of N-cyclohexyl-p-methoxyaniline, 1 part by weight of thio-bis(di-sec-amylphenol), 0.5 parts by weight of N-isopropyl-N'-diphenyl-p-phenylenediamine, 1 part by weight of chlorinated polyethylene, 1 part by weight of chlorinated polyvinyl chloride, 4 parts by weight of aliphatic hydrocarbons-cycloalkanes-aromatic hydrocarbons resin mixtures, 2 parts by weight of carboxymethyl cellulose, 1 part by weight of hydroxyethyl cellulose, 3 parts by weight of carboxymethylhydroxyethyl cellulose, 1 part by weight of acrylic acid, 1 part by weight of N,N-dimethacrylamide, 1 part by weight of N-hydroxymethyl acrylamide, 2 parts by weight of sodium dodecyl sulfate, and 1 part by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.

Swelling rate by weight: >40% in the case of the test pieces immersed in deionized water at room temperature for 4 days
>70% in the case of the test pieces immersed in crude oil at 140° C. for 36 h, and then subjected to cool by immersion at room temperature for 9 days

EXAMPLE 32

24 parts by weight of hydrogenated nitrile-butadiene rubber, 10 parts by weight of nitrile-butadiene rubber, 30 parts by weight of ethylene propylene diene terpolymer, 25 parts by weight of ethylene propylene rubber, 5 parts by weight of natural rubber, 3 pans by weight of chlorosulfonated polyethylene rubber, 3 parts by weight of ethylene-vinyl acetate resin, 40 parts by weight of starch/methyl methacrylate-ethyl acrylate crosslinked graft copolymer, 1 part by weight of sulfur, 1 part by weight of dicumyl peroxide, 1 part by weight of dibenzoyl peroxide, 0.5 parts by weight of N,N'-m-phenylenebismaleimide, 0.5 parts by weight of dibenzothiazole disulfide, 3 parts by weight of N-cyclohexyl-2-benzothiazolesulfenamide, 0.5 parts by weight of diphenyl guanidine, 1 part by weight of stearic acid, 1 part by weight of zinc stearate, 18 parts by weight of carbon black, 4 parts by weight of white carbon black, 5 parts by weight of titanium dioxide, 5 parts by weight of magnesia, 5 parts by weight of zinc oxide, 2 parts by weight of coumarone, 1 part by weight of chlorinated polyethylene, 1 part by weight of chlorinated polyvinyl chloride, 1 part by weight of aliphatic hydrocarbons-cycloalkanes-aromatic hydrocarbons resin mixtures, 0.5 parts by weight of 3-hydroxybutyraldehyde-α-naphthylamine, 0.5 parts by weight of N-phenyl-β-naphthylamine, 0.5 parts by weight of N-cyclohexyl-p-methoxyaniline, 0.5 parts by weight of p-tert-butylphenol, 0.5 parts by weight of 1,2-dihydro-2,2,4-trimethylquinoline polymer, 40 parts by weight of carboxymethyl cellulose, 5 parts by weight of hydroxyethyl cellulose, 18 parts by weight of carboxymethylhydroxyethyl cellulose, 1 part by weight of acrylic acid, 1 part by weight of N,N-dimethacrylamide, 1 part by weight of N-hydroxymethyl acrylamide, 2 parts by weight of sodium dodecyl sulfate, 2 parts by weight of sodium dodecyl benzenesulfonate and 2 parts by weight of cetyl polyoxyethylene ether were subjected to rubber mixing in an open mill or Closed mill at 45~55° C. for 9~15 min (roller distance varies from 4-6 mm to 1-2 mm which makes the product thinner). The pressed product was then taken off from the open mill, and left for cooling.

The products thus obtained were kept at room temperature for 17 h, which was then introduced into a mold, and subjected to molding using a vulcanizing press, and kept at 170° C. 20 min 10 MPa to give the test piece of WOSR.

Swelling rate by weight: >95% in the case of the test pieces immersed in deionized water at room temperature for 2.5 days
>10% in the case of the test pieces immersed in crude oil at 140° C. for 24 h, and then subjected to cool by immersion at room temperature for 10 days The additives or accessory ingredients used in either the oil-swellable material or the oil- and water-swellable material in the Examples of the present invention are not limited to the use in the particular case above. They may be used in both kinds of the materials.

The invention claimed is:

1. A starch-(meth)acrylate graft copolymer comprising emulsion copolymerizing (meth)acrylate monomer and starch in a weight ratio of (0.4-8):1, said graft copolymer further comprising a skeleton of large starch molecule grafted with one or more (meth)acrylate monomers at a grafting ratio of not less than 70%, wherein the grafting ratio=100%×((total weight of the starting materials−weight of the unreacted starting materials−weight of the monomer homopolymer and copolymer)/total weight of the starting materials).

2. The starch-(meth)acrylate graft copolymer according to claim 1, wherein said starch is selected from the group consisting of cereal starch, potato starch and legume starch, and combinations thereof.

3. The starch-(meth)acrylate graft copolymer according to claim 2, wherein said starch is selected from the group consisting of potato starch, sweet potato starch and corn starch, and combinations thereof.

4. The starch-(meth)acrylate graft copolymer according to claim 1, wherein said (meth)acrylate monomer is selected from the group consisting of methyl acrylate, ethyl acrylate, propyl acrylate, butyl acrylate, methyl methacrylate, ethyl methacrylate, propyl methacrylate and butyl methacrylate, and combinations thereof.

5. The starch-(meth)acrylate graft copolymer according to claim 4, wherein the (meth)acrylate monomer is comprised of methyl (meth)acrylate, ethyl (meth)acrylate and butyl (meth)acrylate at the weight ratio of 1:(0-10):(0-20).

6. An oil swellable material, which comprises the starch-(meth)acrylate graft copolymer of claim 1.

7. The oil swellable material according to claim 6, wherein said material is oil swellable rubber comprising rubber matrix and starch-(meth)acrylate graft copolymer; and said oil swellable rubber comprises 5-40 parts by weight of said starch-(meth)acrylate graft copolymer, based on 100 parts by weight of said rubber matrix.

8. The oil swellable material according to claim 7, wherein said rubber matrix is selected from the group consisting of nitrile-butadiene rubber, hydrogenated nitrile-butadiene rubber, ethylene-propylene rubber and ethylene-propylene terpolymer, and combinations thereof.

9. The oil swellable material according to claim 7, which further comprises one or more additives selected from the group consisting of vulcanizing agent, filler, vulcanization accelerator, plasticizer, other additives and combinations thereof; wherein,
said vulcanization accelerator is selected from the group consisting of tetramethyl thiuram disulfide, 2-mercaptobenzothiazole, N-cyclohexyl-2-benzothiazolesulfenamide and diphenyl guanidine, and combinations thereof;
said vulcanizing agent is selected from the group consisting of sulfur, dicumyl peroxide, di-tert-butyl peroxide, dibenzoyl peroxide (BPO), N,N'-m-phenylene bismaleimide, tetramethyl thiuram disulfide, 4,4'-dithiodimorpholine and tetraethyl thiuram disulfide, and combinations thereof;
said filler is selected from the group consisting of carbon black, white carbon black, pot clay, talc powder, mica powder, calcium silicate, calcium carbonate, magnesium carbonate, titanium dioxide, magnesia, zinc oxide and graphite, and combinations thereof;
said plasticizer is selected from the group consisting of vaseline, machine oil, paraffin, rosin, coal tar, coumarone resin, glycerin, stearic acid or the salts thereof, dibutyl phthalate, dioctyl adipate and phenolic resins, and combinations thereof; and
said other additives are selected from the group consisting of 3-hydroxybutyraldehyde-α-naphthylamine, 1,2-dihydro-2,2,4-trimethylquinoline polymer, N-phenyl-β-naphthylamine N-cyclohexyl-p-methoxyaniline, p-tert-butylphenol, thiobis(di-sec-amylphenol), low molecular nitrile-butadiene/diphenylamine graft products, N-(4-phenylaminophenyl)maleimide, N-(4-phenylaminophenyl) methacrylamide, styrene/acrylonitrile random copolymers, nitrile-butadiene rubber/butadiene rubber, chlorinated polyethylene, chlorinated polyvinyl chloride, cellulose acetate/polyacrylonitrile graft copolymer, aliphatic hydrocarbon-cycloalkane-aromatic hydrocarbon resin mixtures and polystyrene/polyethylene block copolymer, and combinations thereof.

10. The oil swellable material according to claim 6, wherein said material is oil absorbing rubber-plastic material comprising rubber-plastic material matrix and starch-(meth)acrylate graft copolymer; and said material comprises 5-40 parts by weight of starch-(meth)acrylate graft copolymer, based on 100 parts by weight of rubber-plastic material matrix.

11. The oil swellable material according to claim 10, which further comprises one or more additives selected from the group consisting of vulcanizing agent, filler, vulcanization accelerator, plasticizer, other additives, and combinations thereof, wherein the other additives are selected from the group consisting of 3-hydroxybutyraldehyde-α-naphthylamine, 1,2-dihydro-2,2,4-trimethylquinoline polymer, N-phenyl-β-naphthylamine N-cyclohexyl-p-methoxyaniline, p-tert-butylphenol, thiobis (di-sec-amyl phenol), low molecular nitrile-butadiene/diphenylamine graft products, N-(4-phenylaminophenyl)maleimide, N-(4-phenylaminophenyl) methacrylamide, styrene/acrylonitrile random copolymers, nitrile-butadiene rubber/butadiene rubber, chlorinated polyethylene, chlorinated polyvinyl chloride, cellulose acetate/polyacrylonitrile graft copolymer, aliphatic hydrocarbon-cycloalkane-aromatic hydrocarbon resin mixtures and polystyrene/polyethylene block copolymer, and combinations thereof.

12. An oil- and water-swellable material comprising the starch-(meth)acrylate graft copolymer of claim 1, water absorbing agent, reactive monomer, surfactant and material matrix; wherein,
said material comprises 5-40 parts by weight of the starch-(meth)acrylate graft copolymer, 3-100 parts by weight of the water absorbing agent, 0-30 parts by weight of the reactive monomer, and 0-70 parts by weigh of the surfactant, based on 100 parts by weight of the material matrix; and
said water absorbing agent is natural hydrophilic polymer or its derivatives having water absorbing groups; said reactive monomer is water absorbing groups containing monomer or quaternary ammonium salt monomer, or alkenes monomers having hydrophilic groups formed by hydrolysis, said monomers contain unsaturated bonds capable of crosslinking with said water absorbing agent.

13. The oil- and water-swellable material according to claim 12, wherein said material comprises 0.5-30 parts by weight of said reactive monomer and 0.5-70 parts by weight of said surfactant.

14. The oil- and water-swellable material according to claim 13, wherein said water absorbing agent is hydroxyl- and/or carboxyl-containing cellulose or its derivatives, and said surfactant is ionic surfactant.

15. The oil- and water-swellable material according to claim 13, wherein said reactive monomer is acrylamides including N-hydroxymethyl acrylamide; and said surfactant is selected from the group consisting of sodium dodecyl sulfate, sodium dodecyl sulfonate and sodium dodecyl benzenesulfonate, and combinations thereof.

16. The oil- and water-swellable material according to claim 12, wherein said material matrix is rubber matrix, and said oil- and water-swellable material further comprises one or more additives selected from the group consisting of vulcanizing agent, filler, vulcanization accelerator, plasticizer, other additives, and combinations thereof; wherein
said vulcanization accelerator is selected from the group consisting of tetramethyl thiuram disulfide, 2-mercaptobenzothiazole, N-cyclohexyl-2-benzothiazolesulfenamide and diphenyl guanidine, and combinations thereof;
said vulcanizing agent is selected from the group consisting of sulfur, dicumyl peroxide, di-tert-butyl peroxide, dibenzoyl peroxide (BPO), N,N'-m-phenylene bismaleimide, tetramethyl thiuram disulfide, 4,4'-dithiodimorpholine and tetraethyl thiuram disulfide, and combinations thereof;
said filler is selected from the group consisting of carbon black, white carbon black, pot clay, talc powder, mica powder, calcium silicate, calcium carbonate, magnesium carbonate, titanium dioxide, magnesia, zinc oxide and graphite, and combinations thereof;
said plasticizer is selected from the group consisting of vaseline, machine oil, paraffin, rosin, coal tar, coumarone resin, glycerin, stearic acid or the salts thereof, dibutyl phthalate, dioctyl adipate and phenolic resins, and combinations thereof; and
said other additives are selected from the group consisting of 3-hydroxybutyraldehyde-α-naphthylamine, 1,2-dihydro-2,2,4-trimethylquinoline polymer, N-phenyl-β-naphthylamine N-cyclohexyl-p-methoxyaniline, p-tert-butylphenol, thio bis(di-sec-amyl phenol), low molecular nitrile-butadiene/diphenylamine graft products, N-(4-phenylaminophenyl)maleimide, N-(4-phenylaminophenyl) methacrylamide, styrene/acrylonitrile random copolymers, nitrile-butadiene rubber/butadiene rubber, chlorinated polyethylene, chlorinated polyvinyl chloride, cellulose acetate/polyacrylonitrile graft copolymer, aliphatic hydrocarbons-cycloalkanes-aromatic hydrocarbons resin mixtures and polystyrene/polyethylene block copolymer, and combinations thereof.

17. The oil-and water-swellable material according to claim 16, wherein said rubber matrix is selected from the group consisting of nitrile-butadiene rubber, hydrogenated nitrile-butadiene rubber, ethylene-propylene rubber and ethylene-propylene terpolymer, and combinations thereof.

18. The oil-and water-swellable material according to claim 12, wherein said material matrix is rubber-plastic material matrix; and said oil-and water-swellable material further comprises one or more additives selected from the group consisting of vulcanizing agent, filler, vulcanization accelerator, plasticizer, other additives, and combinations thereof.

19. A sealing article or packer comprising the material of claim 6.

20. A sealing article or packer comprising the material of claim 12.

21. The starch-(meth)acrylate graft copolymer according to claim 1, wherein the starch-(meth)acrylate graft copolymer is prepared by non-crosslinked emulsion copolymerizing (meth)acrylate monomer and starch.

22. The starch-(meth)acrylate graft copolymer according to claim 1, wherein the starch-(meth)acrylate graft copolymer is prepared by crosslinked emulsion copolymerizing (meth) acrylate monomer and starch.

23. The starch-(meth)acrylate graft copolymer according to claim 22, wherein the starch-(meth)acrylate graft copolymer is prepared by crosslinked copolymerization using one or more crosslinkers selected from the group consisting of ethylene glycol diacrylate, ethylene glycol dimethacrylate, diethylene glycol dimethacrylate, polyethylene glycol diacrylate, polyethylene glycol dimethacrylate or propylene glycol diacrylate, N,N'-methylene bis(meth)acrylamide, diallyl phthalate, diallyl terephthalate, diallyl maleate, triallyl polycyanurate, triallyl isocyanurate, divinylbenzene and mixtures thereof.

* * * * *